(12) United States Patent
Abdul-Hadi et al.

(10) Patent No.: US 8,451,001 B2
(45) Date of Patent: May 28, 2013

(54) UTILITY METER ADAPTER

(75) Inventors: Louay Ibrahim Abdul-Hadi, Woodstock, GA (US); Nathan Edward Woody, Cumming, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 94 days.

(21) Appl. No.: 13/205,903

(22) Filed: Aug. 9, 2011

(65) Prior Publication Data
US 2013/0036834 A1 Feb. 14, 2013

(51) Int. Cl.
*G01B 7/30* (2006.01)

(52) U.S. Cl.
USPC .................................... 324/207.25

(58) Field of Classification Search
None
See application file for complete search history.

(56) References Cited

U.S. PATENT DOCUMENTS

| | | | |
|---|---|---|---|
| 4,600,923 A * | 7/1986 | Hicks et al. | 340/870.02 |
| D310,973 S | 10/1990 | Edwards et al. | |
| 5,690,049 A | 11/1997 | Marshall et al. | |
| 6,100,816 A | 8/2000 | Moore | |
| 7,113,063 B2 | 9/2006 | Romanik et al. | |
| 7,400,265 B2 * | 7/2008 | Gebler et al. | 340/870.33 |
| 2002/0059895 A1 | 5/2002 | Adams et al. | |
| 2005/0046417 A1 * | 3/2005 | Hwang et al. | 324/207.25 |
| 2009/0038535 A1 | 2/2009 | Morales et al. | |
| 2009/0153357 A1 * | 6/2009 | Bushman et al. | 340/870.02 |
| 2009/0212767 A1 | 8/2009 | Di Marco et al. | |
| 2012/0227511 A1 | 9/2012 | Davis et al. | |
| 2012/0227518 A1 | 9/2012 | Abdul-Hadi et al. | |

OTHER PUBLICATIONS

U.S. Appl. No. 13/042,764 , "Office Action", Sep. 5, 2012, 6 pages.

* cited by examiner

*Primary Examiner* — Robert R Raevis
(74) *Attorney, Agent, or Firm* — Kilpatrick Townsend & Stockton LLP

(57) ABSTRACT

An adapter assembly that works with a standard utility meter to wirelessly transmit data about consumption. The adapter assembly generates information about consumption by cooperating with a pointer or shaft of an index (or index bracket) of a utility meter. In some versions, the adapter assembly includes an upper portion and a lower portion that interface together. The upper portion and the lower portion are configured to maintain alignment with the pointer/shaft and not create stress on the index.

20 Claims, 45 Drawing Sheets

UTILITY METER ADAPTER

RELATED APPLICATIONS

This application is related to U.S. Ser. No. 13/042,913, which was filed on Mar. 8, 2011 and is titled "Utility Meter Adapter" and U.S. Ser. No. 13/042,764, which was filed on Mar. 8, 2011 and is titled "Utility Meter Adapter," the contents of both of which are hereby incorporated by reference.

RELATED FIELDS

Utility meter adapters, and more particularly, improved adapters for retrofitting an analog utility meter to support remote data collection.

BACKGROUND

The usage of utility products such as gas and electricity and water are typically measured using meters. In the context of gas, a gas meter is used to measure the volume of gas moving through the meter. At least one diaphragm is located inside the typical gas meter that expands and contracts as gas moves through the meter. The movement of the diaphragm causes a rotation of a series of gears inside the meter, which in turn engages a gear located on the back of the face (also referred to herein as the index) of the meter. The gear on the back of the index of the meter turns a pointer that acts as a counter mechanism and that is visible on the face of the meter. Other types of utility meters also include similar types of gears and indexes. Typically, a utility company employee physically inspects each customer's meter and notes the positioning of the counter with respect to the dials on the face of the meter.

The process of determining meter consumption has become more automated in recent years. Automated meters that automatically capture consumption data and transmit this data wirelessly are used in some contexts. In lieu of replacing all existing meters with new automated meters, adapters are used that retrofit existing meters so they have remote data collection capability.

SUMMARY

Disclosed are adapter assemblies that work with analog utility meters, such as, but not limited to, Sprague, American, Rockwell, and Schlumberger brand utility meters, to transmit data about consumption. The adapter assembly cooperates with a pointer of an index of a utility meter to generate magnet pulses as the pointer rotates. In some versions, the adapter assembly includes an upper portion and a lower portion that mate together. The upper portion and the lower portion are configured to interact with each other to maintain alignment with the pointer and reduce stress on the index.

Applicants do not wish to be bound by the forgoing or any other understanding of how their invention or any of the prior art works.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different figures is intended to illustrate like or analogous components.

DETAILED DESCRIPTION

FIGS. 1-17 illustrate different views of various components of an adapter assembly 10 according to one version. An adapter assembly 10 according to this version comprises an upper portion 12 (FIGS. 5-10) and a lower portion 14 (FIGS. 11-17) that mate together around pointers of various indexes (see FIGS. 18-47).

Figure 6:
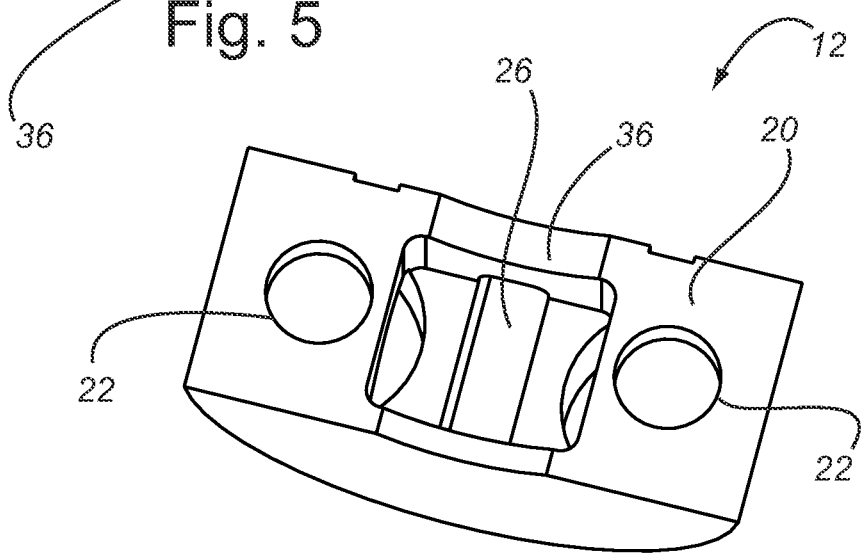
FIG. 6 is a bottom perspective view of the upper portion of FIG. 5.
Figure 7:
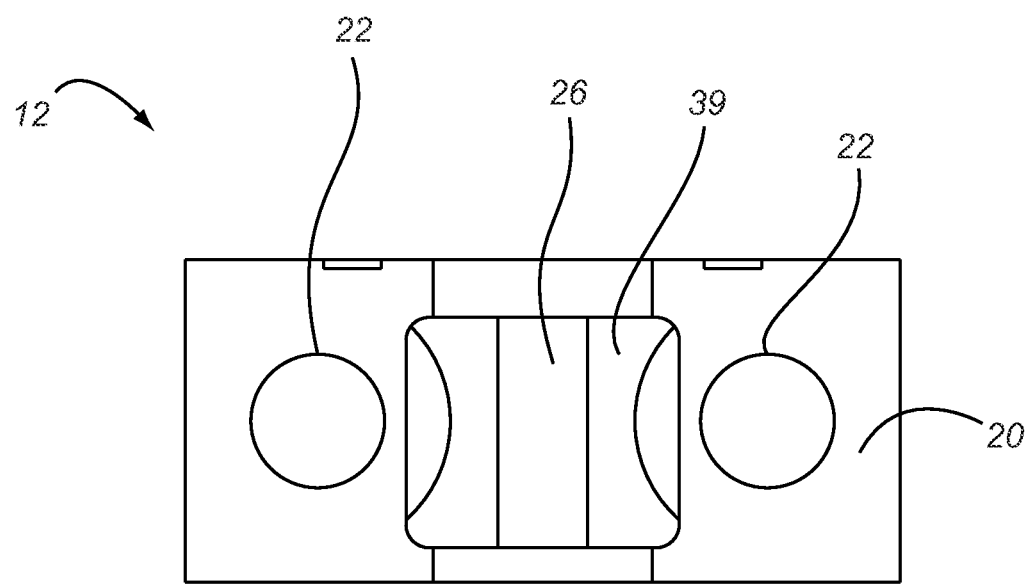
FIG. 7 is a bottom plan view of the upper portion of FIG. 5.
Figure 8:
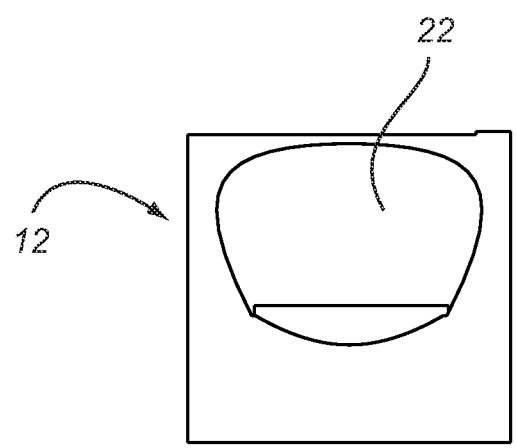
FIG. 8 is a side plan view of the upper portion of FIG. 5.
Figure 9:
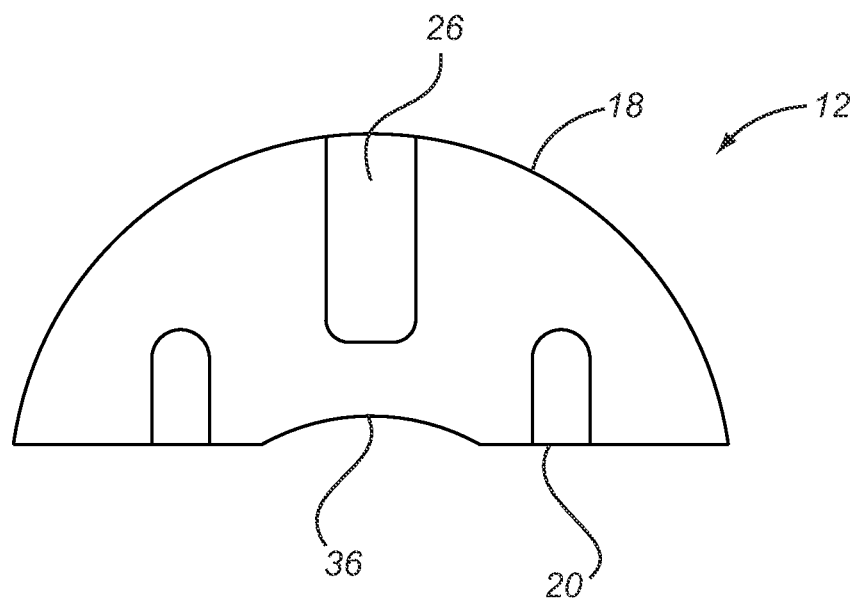
FIG. 9 is a front plan view of the upper portion of FIG. 5.
Figure 10:
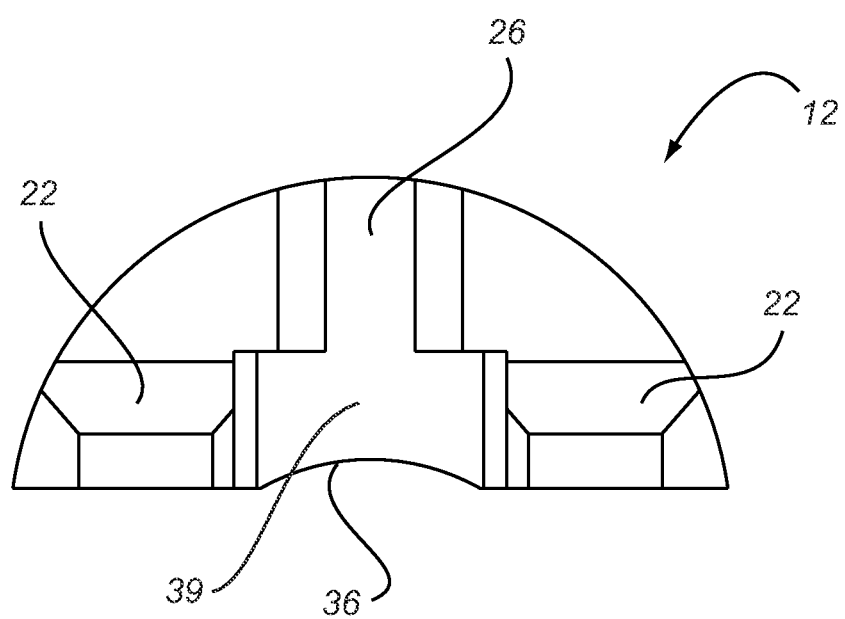
FIG. 10 is a cross-sectional view of the upper portion of FIG. 5, shown interfitted with fasteners.

In some adapters, upper portion 12 of adapter assembly 10 is hemispherical, although upper portion 12 can be any suitable shape. Upper portion 12 includes a top surface 18 (FIG. 5) and a bottom surface 20 (FIG. 6). In some adapters, top surface 18 is arcuate, while bottom surface 20 is relatively flat. One or more openings 22 are formed in upper portion 12, the one or more openings being shaped and sized to receive one or more fasteners 24 (shown in FIGS. 1-4). In the adapter shown, upper portion 12 includes two openings 22. Openings 22 extend from the top surface 18 through the bottom surface 20. In some adapters, openings 22 are larger as formed in the top surface 18 and are smaller in size in the bottom surface 20. In this way, the opening formed in the top surface 18 is sized and shaped to accommodate a head of a fastener, such as head 25 of fastener 24 shown in FIG. 1, while the opening formed in the bottom surface 20 is sized and shaped to receive a body of a fastener, such as body 23 or 23' of fastener 24. In other adapters, openings 22 may be shaped and sized differently to receive other types of fasteners. For example, opening 22 may be uniform in size throughout upper portion 12.

A recess 26 is also formed in the top surface 18 of the upper portion 12. Recess 26 is shaped and sized to receive tip 6 of pointer 4 of a gas meter index having certain configurations (such as indexes 100 and 104, illustrated in FIGS. 18-25 and FIGS. 33-40). Upper portion 12 also includes an aperture 39 (FIGS. 7 and 10) that abuts recess 26 and that is sized and shaped to accommodate the body 8 of a pointer 4 of an index. In some adapters, aperture 39 has a width that is slightly larger than the width of the body 8 of a standard pointer 4. A cutout 36 is formed upward from the bottom of the upper portion 12 (see FIGS. 9-10, for example). In some adapters, the cutout 36 is arcuate.

Figure 11:
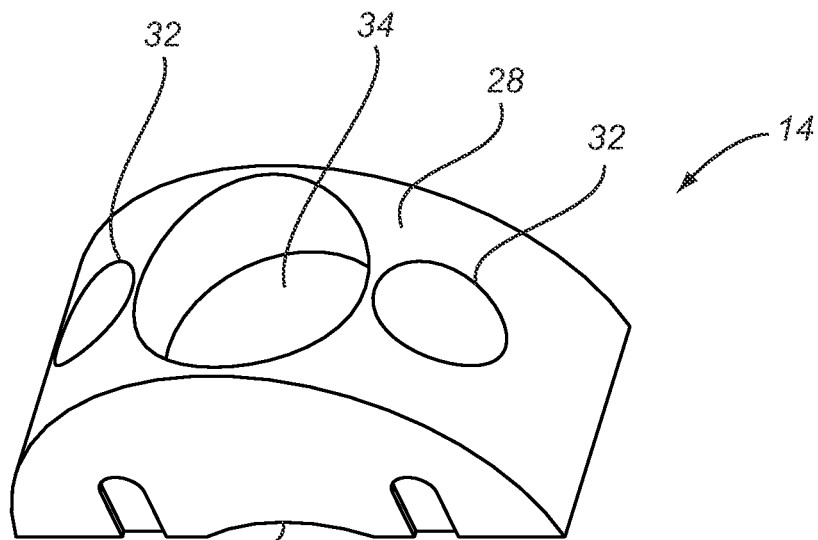
FIG. 11 is a top perspective view of the lower portion of the adapter assembly of FIG. 1.
Figure 12:
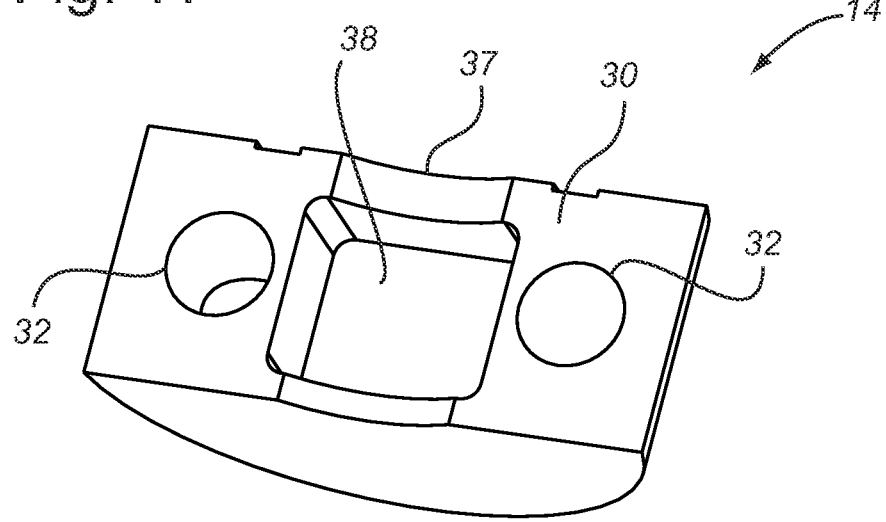
FIG. 12 is a bottom perspective view of the lower portion of FIG. 11.
Figure 13:
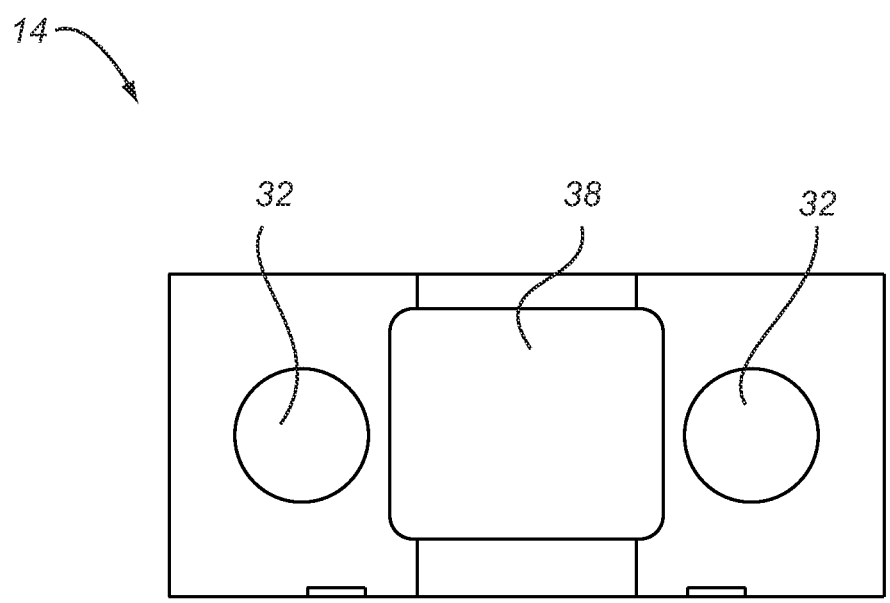
FIG. 13 is a bottom plan view of the lower portion of FIG. 11.
Figure 14:
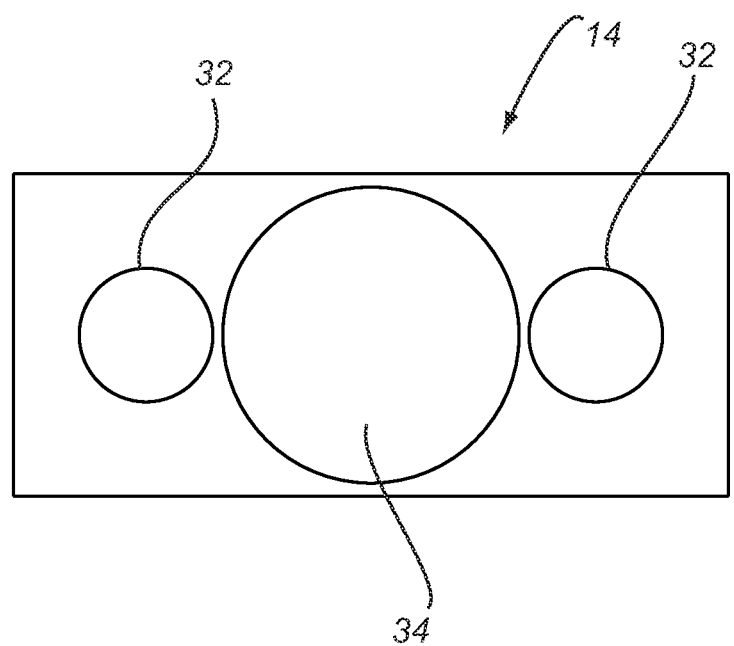
FIG. 14 is a top plan view of the lower portion of FIG. 11.
Figure 15:
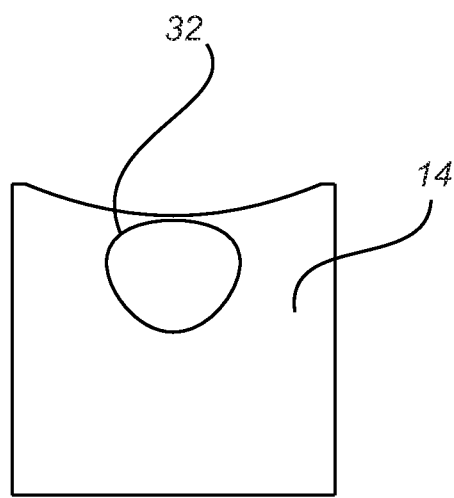
FIG. 15 is a side plan view of the lower portion of FIG. 11.
Figure 16:
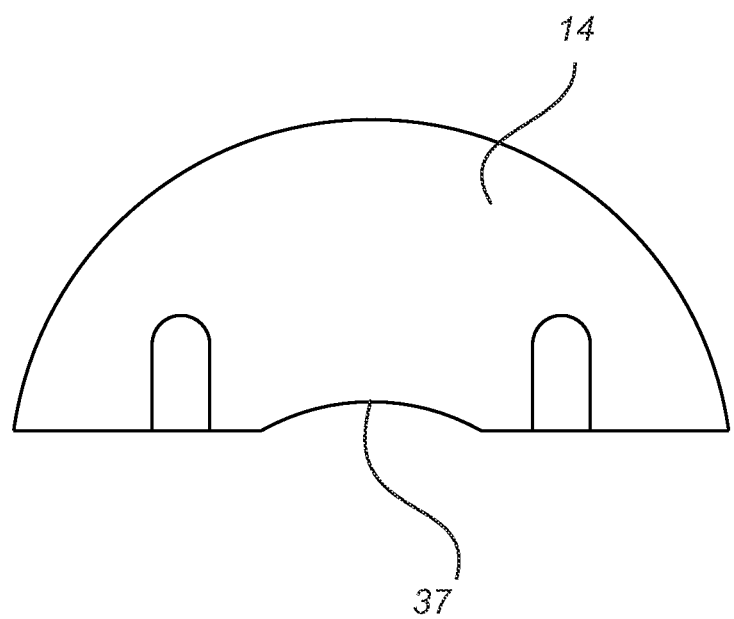
FIG. 16 is a front plan view of the lower portion of FIG. 11.
Figure 17:
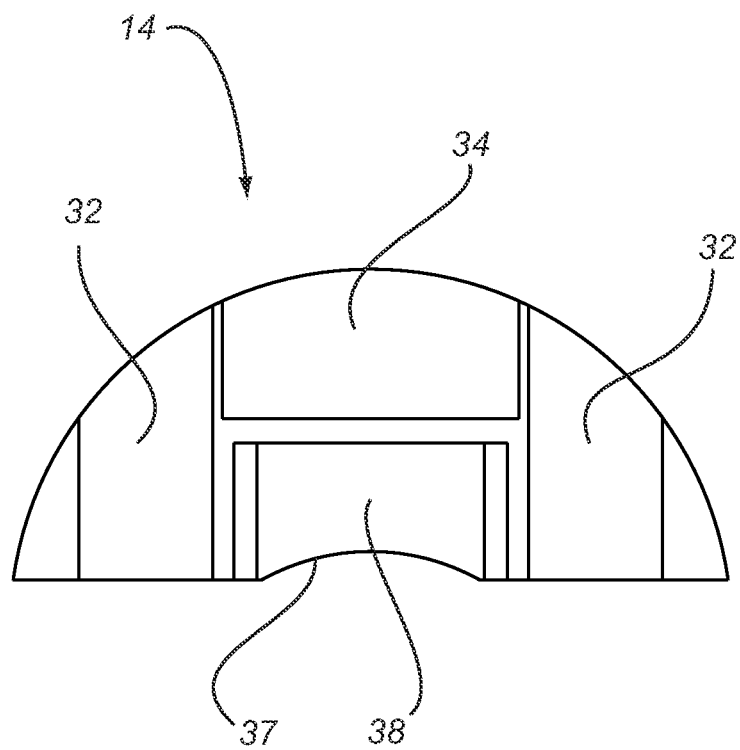
FIG. 17 is a cross-sectional view of the lower portion of FIG. 11, shown interfitted with fasteners.

As shown in FIGS. 11-17, lower portion 14 of adapter assembly 10 is hemispherical, although lower portion 14 can be any suitable shape. In some adapters, lower portion 14 and upper portion 12 are similar in shape and size. In the adapters where lower portion 14 and upper portion 12 are similar in shape and size, the symmetry of the two sides allows the position of the two portions on the index to be swapped. Lower portion 14 includes a top surface 28 (FIG. 11) and a bottom surface 30 (FIG. 12). In some adapters, top surface 28 is arcuate, while bottom surface 30 is relatively flat. In some adapters, lower portion 14 includes a cutout 37 formed upward from the bottom of lower portion 14, the cutout 37 being arcuate in some adapters. In some adapters, lower portion 14 includes an aperture 38 (FIGS. 12-13 for example) that is sized and shaped to accommodate the body 8 of the pointer 4. In some adapters, aperture 38 has a width that is slightly larger than the width of the body 8 of a standard pointer 4.

Bottom surface 20 of upper portion 12 and bottom surface 30 of lower portion 14 are configured to correspond to one another. Since upper portion 12 and lower portion 14 are both semi-circular, when fitted together, upper portion 12 and lower portion 14 form a generally circular adapter assembly 10 (see FIGS. 1-4 and FIGS. 24-25, for example). In some adapters, a gap 44 is formed in some adapters when upper portion 12 and lower portion 14 are fitted together (see FIGS. 24-25 for example).

Figure 24:
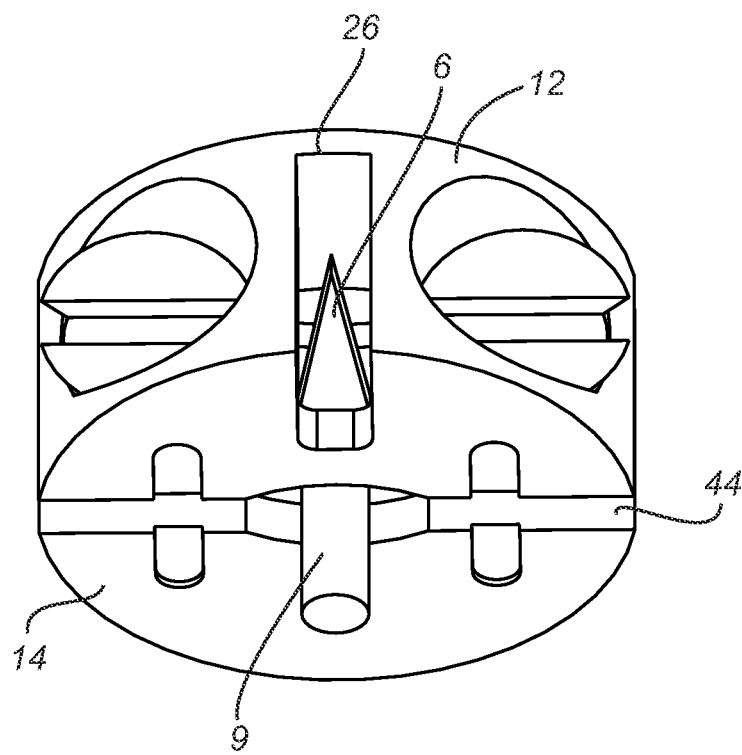
FIG. 24 is a top perspective view of the adapter assembly of FIG. 23 fitted around the pointer of FIG. 23.
Figure 25:
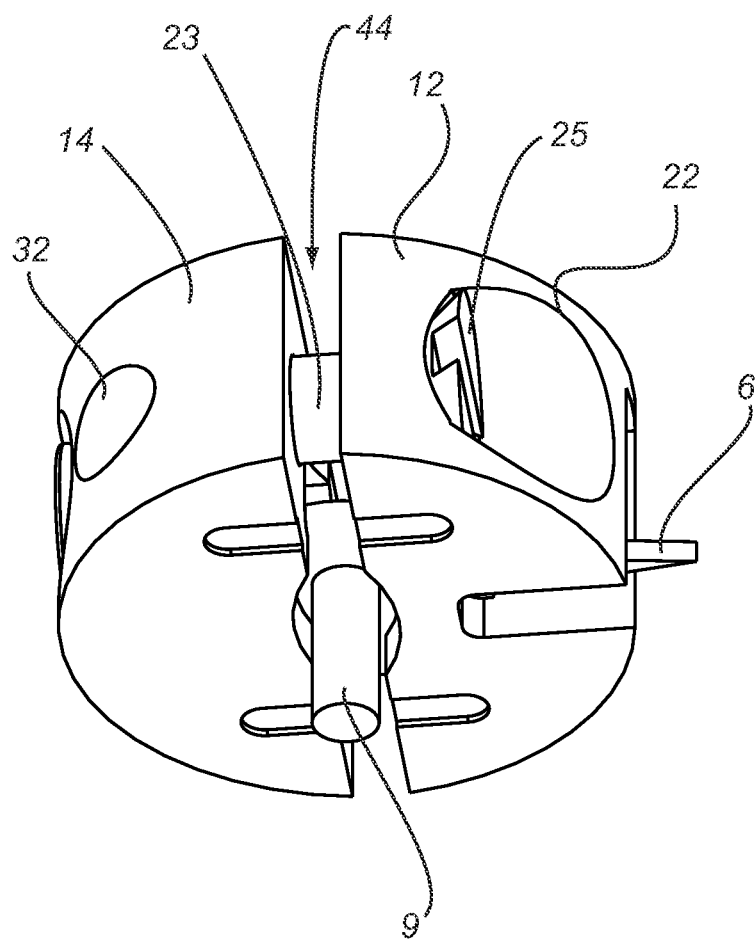
FIG. 25 is a rear perspective view of the adapter assembly of FIG. 23 fitted around the pointer of FIG. 23.
Figure 26:
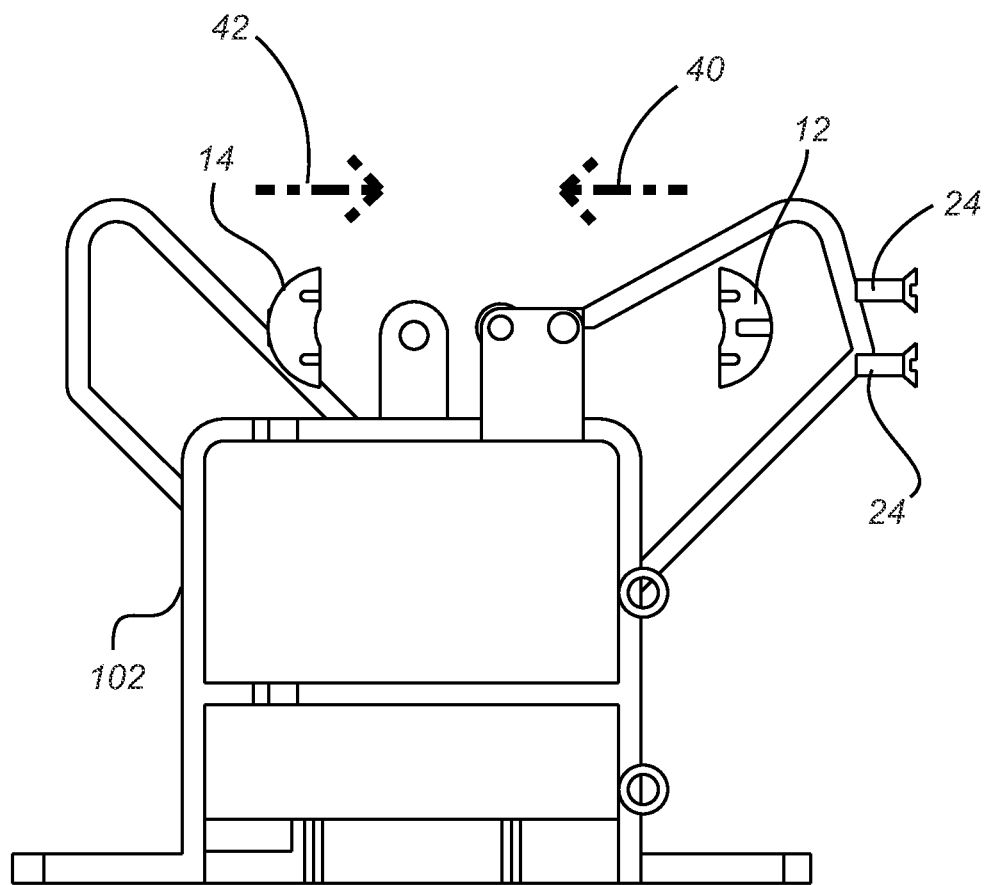
FIG. 26 is a front plan view of a second index bracket positioned with respect to the upper portion of FIG. 5 and the lower portion of FIG. 11, according to one version.
Figure 27:
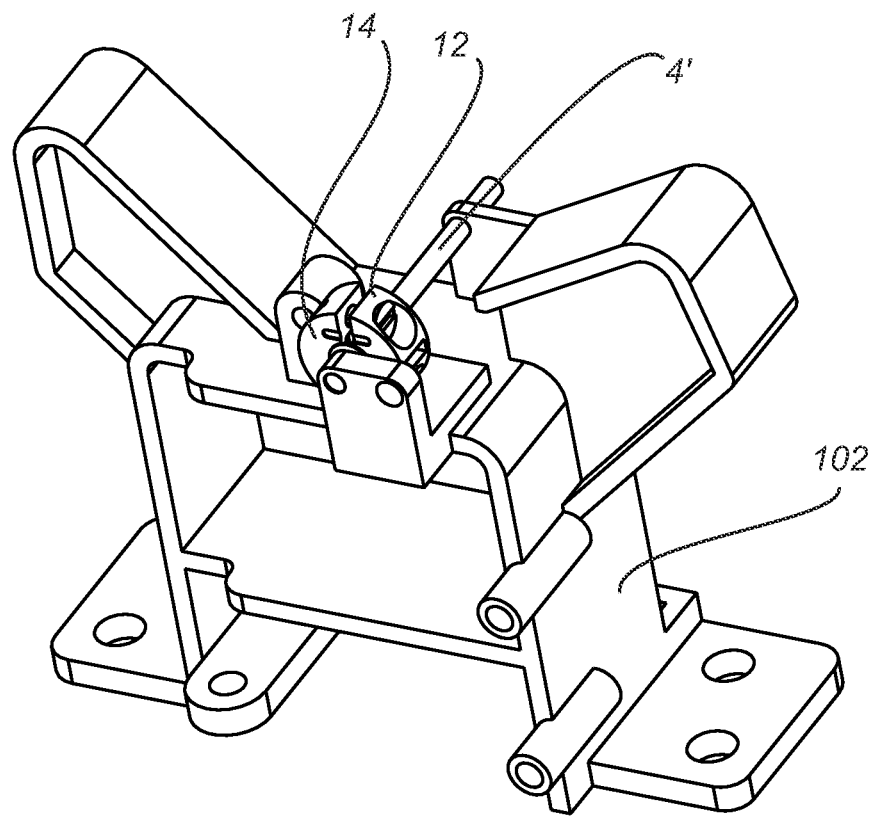
FIG. 27 is a front perspective view of the second index bracket of FIG. 26 fitted with the adapter assembly of FIG. 26.
Figure 28:
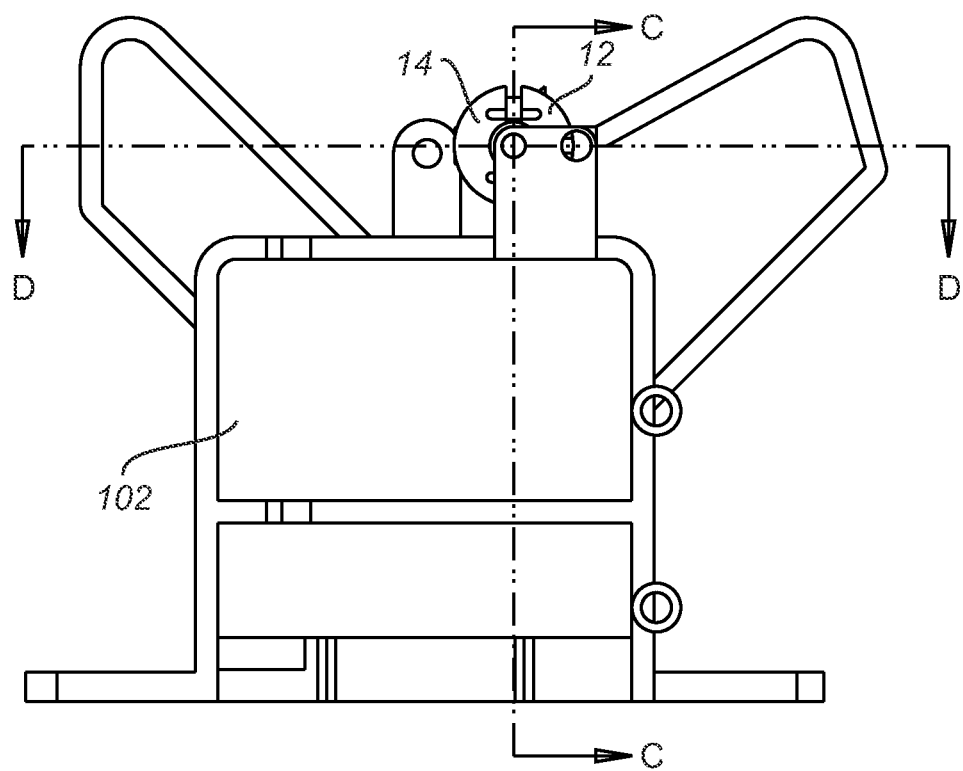
FIG. 28 is a front plan view of the second index bracket of FIG. 26 fitted with the adapter assembly of FIG. 26.
Figure 29:
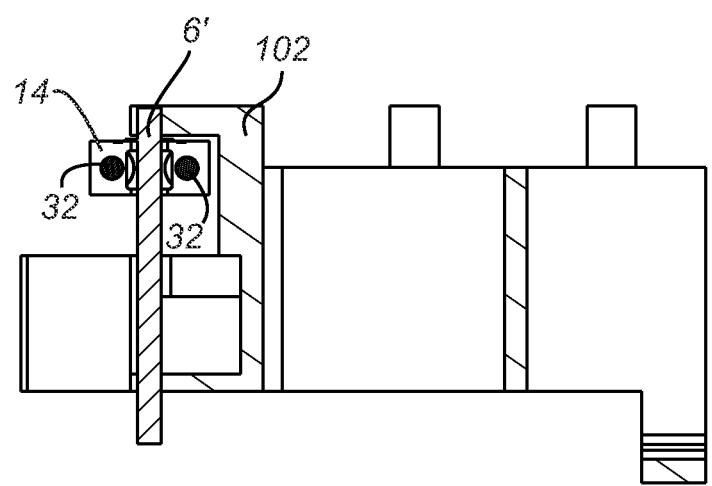
FIG. 29 is a cross-sectional view of the second index bracket of FIG. 26 fitted with the adapter assembly of FIG. 26, taken along line C-C of FIG. 28.
Figure 30:
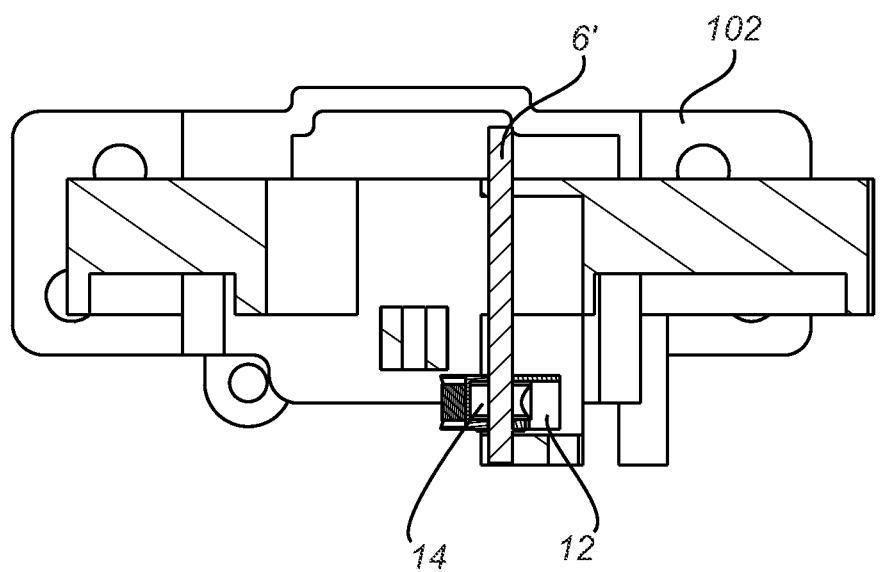
FIG. 30 is a cross-sectional view of the second index bracket of FIG. 26 fitted with the adapter assembly of FIG. 26, taken along line D-D of FIG. 28.
Figure 31:
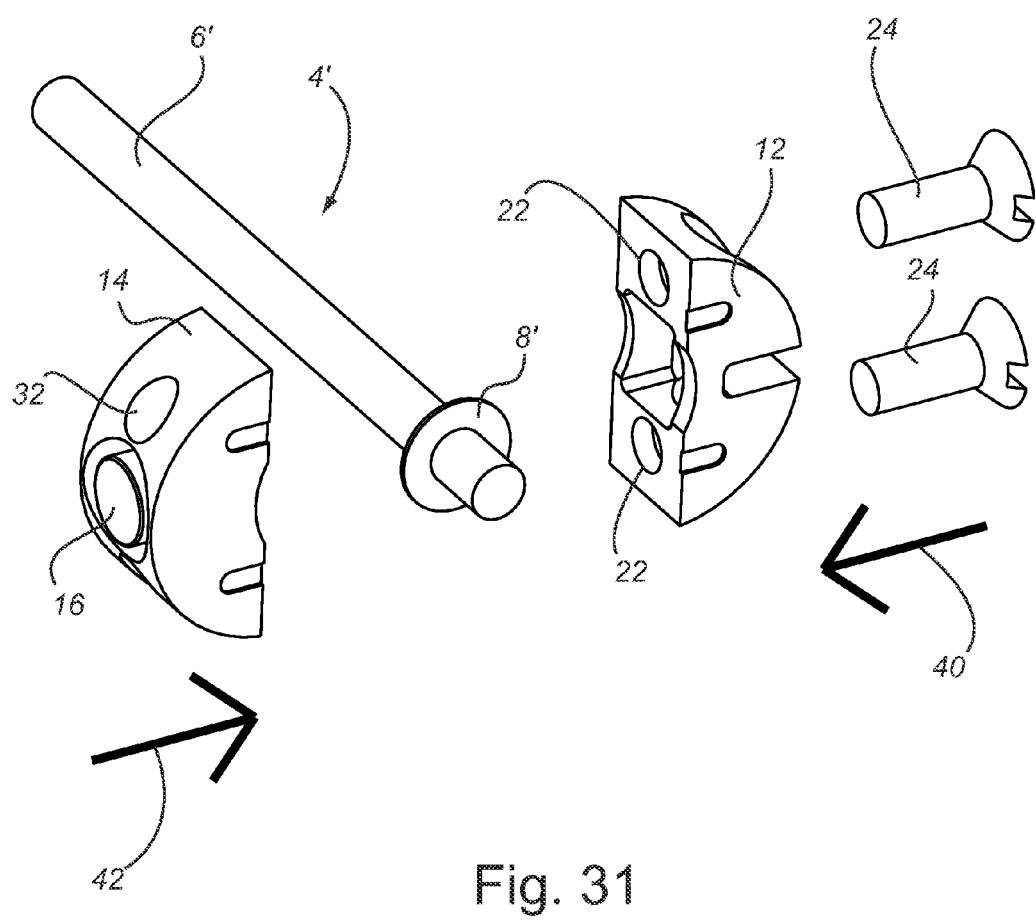
FIG. 31 is an exploded view of the upper portion of FIG. 5 and the lower portion of FIG. 11 positioned with respect to the pointer of the second index bracket of FIG. 26.
Figure 32:
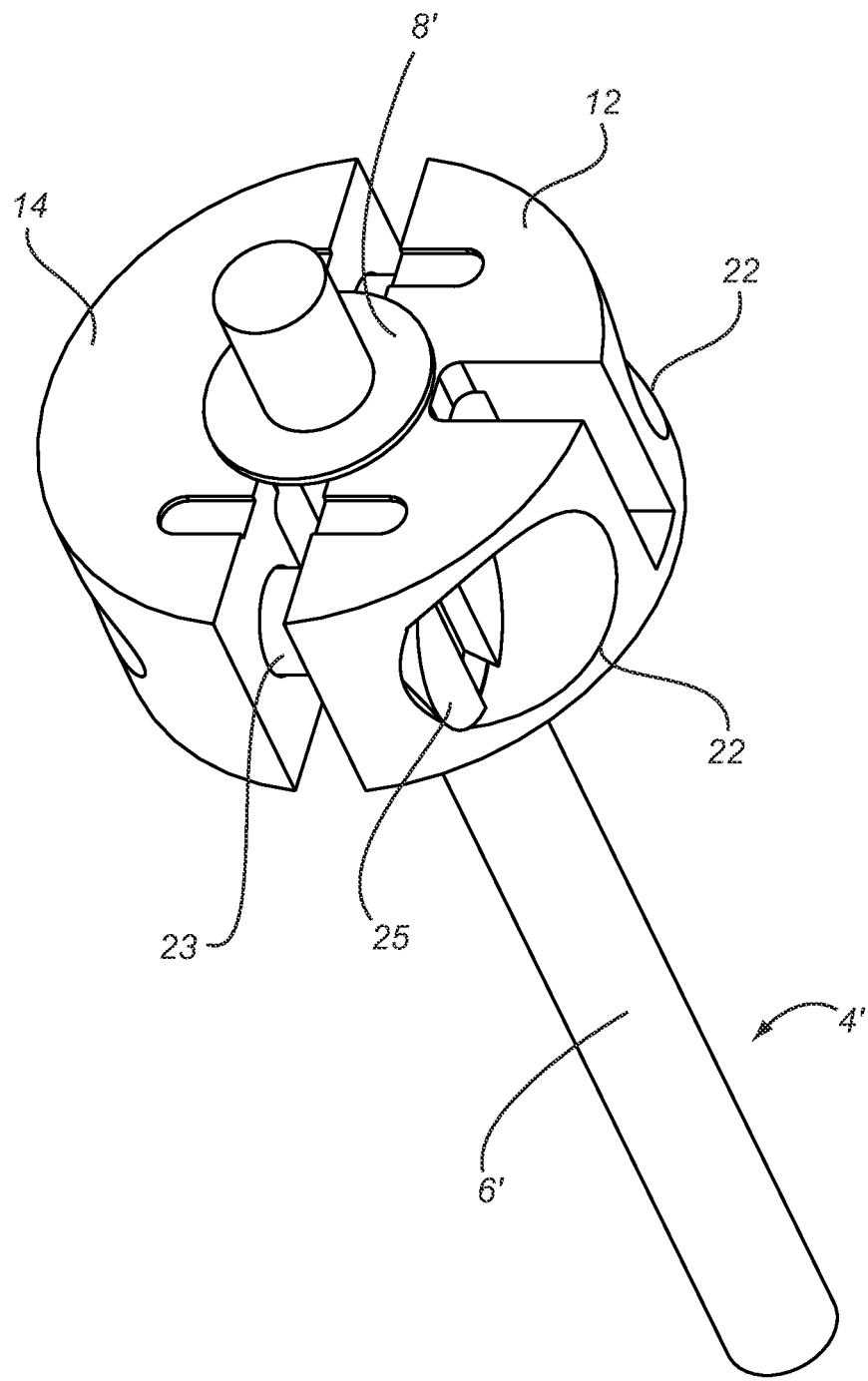
FIG. 32 is a top perspective view of the adapter assembly of FIG. 23 fitted around the shaft of FIG. 23.
Figure 33:
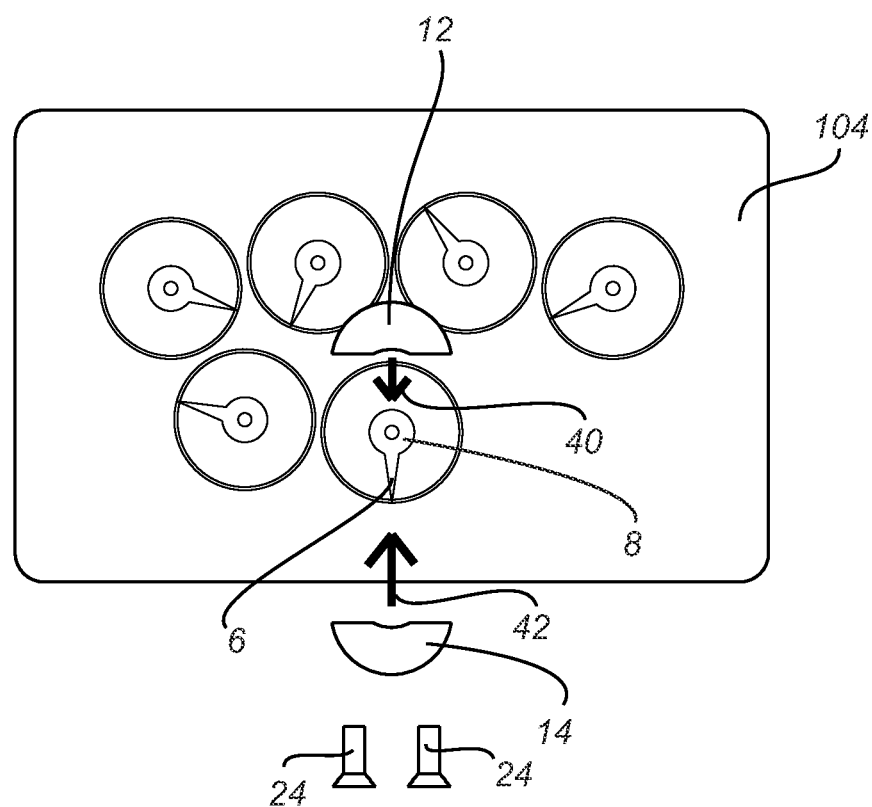
FIG. 33 is a front plan view of a third index positioned with respect to the upper portion of FIG. 5 and the lower portion of FIG. 11, according to one version.
Figure 34:
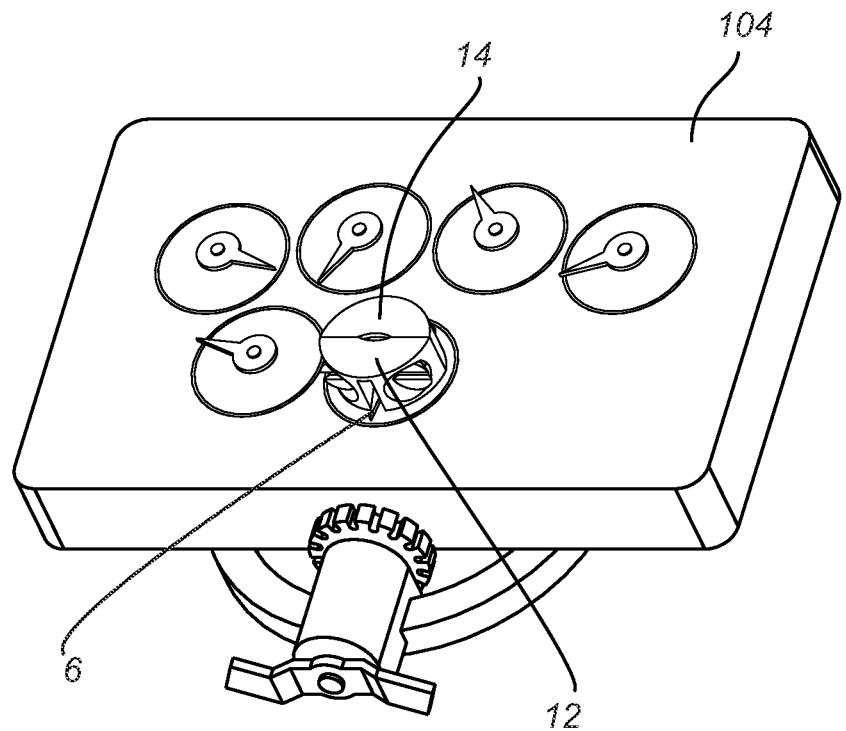
FIG. 34 is a front perspective view of the third index of FIG. 33 fitted with the adapter assembly of FIG. 33.
Figure 35:
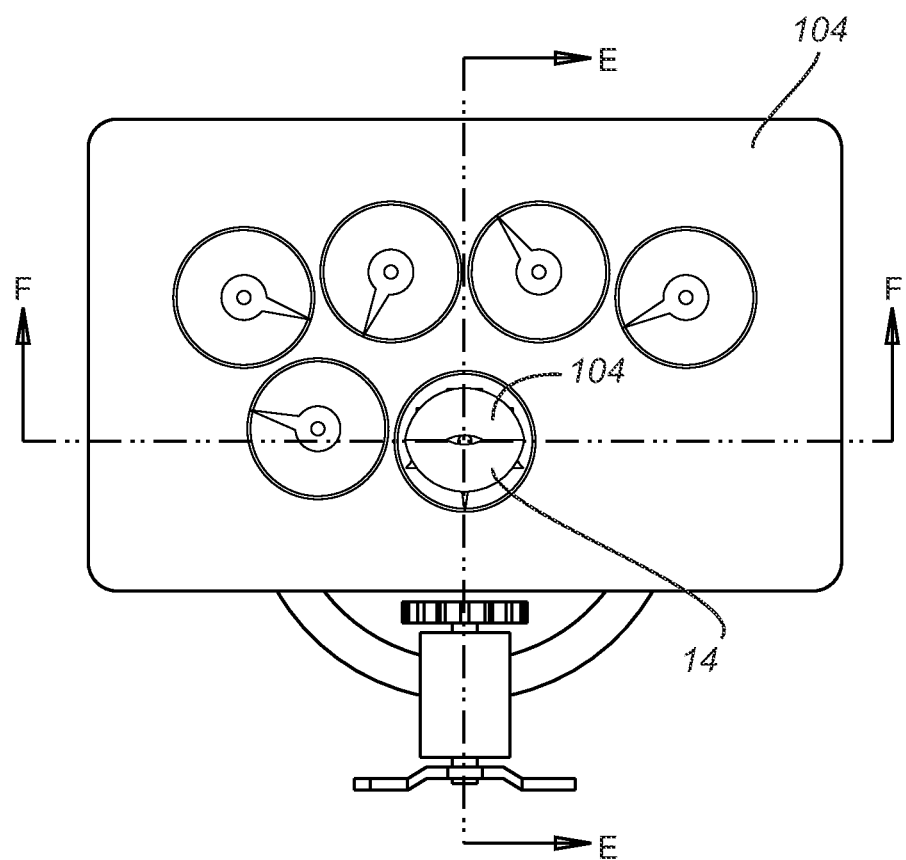
FIG. 35 is a front plan view of the third index of FIG. 33 fitted with the adapter assembly of FIG. 33.
Figure 36:
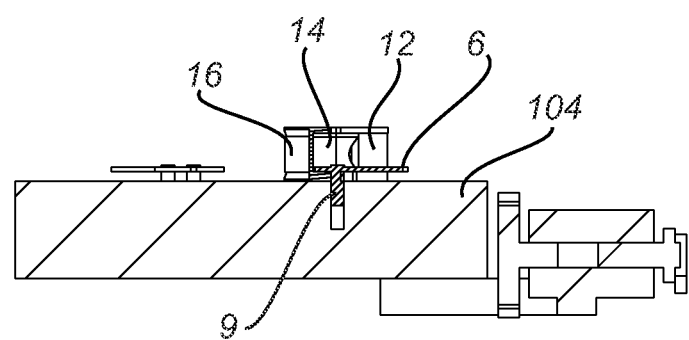
FIG. 36 is a cross-sectional view of the third index of FIG. 33 fitted with the adapter assembly of FIG. 33, taken along line E-E of FIG. 35.
Figure 37:
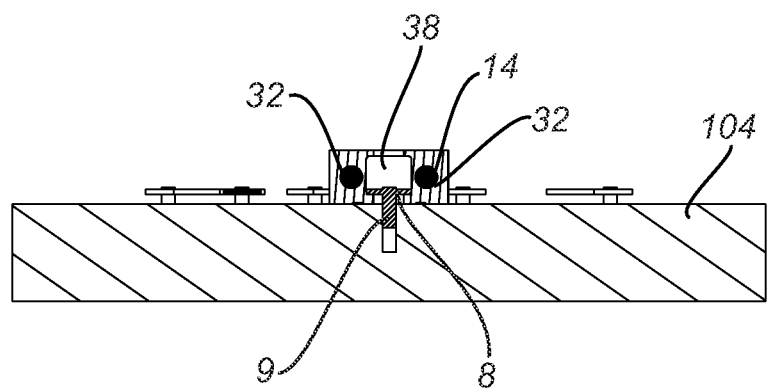
FIG. 37 is a cross-sectional view of the third index of FIG. 33 fitted with the adapter assembly of FIG. 33, taken along line F-F of FIG. 35.
Figure 38:
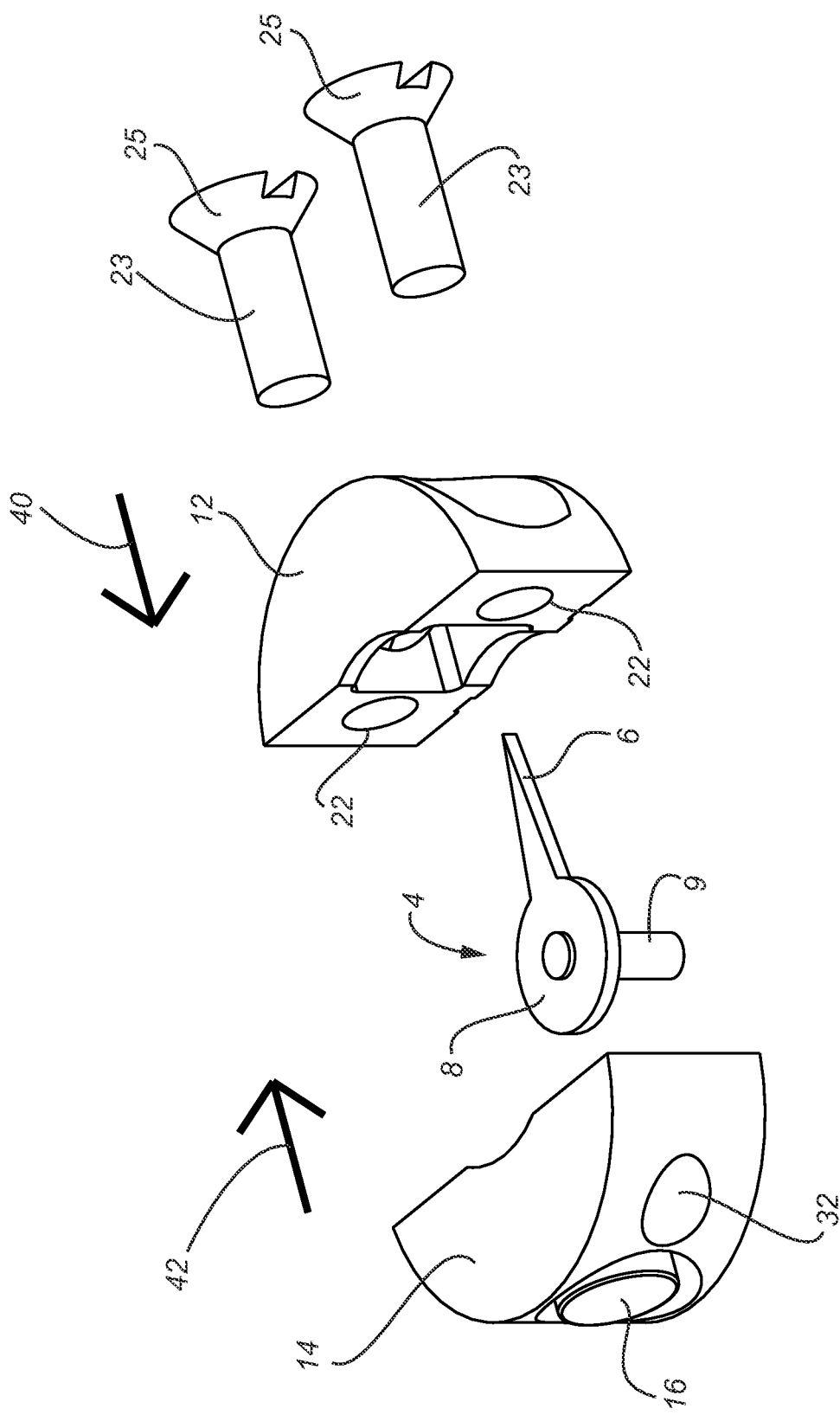
FIG. 38 is an exploded view of the upper portion of FIG. 5 and the lower portion of FIG. 11 positioned with respect to the pointer of the third index of FIG. 33.
Figure 39:
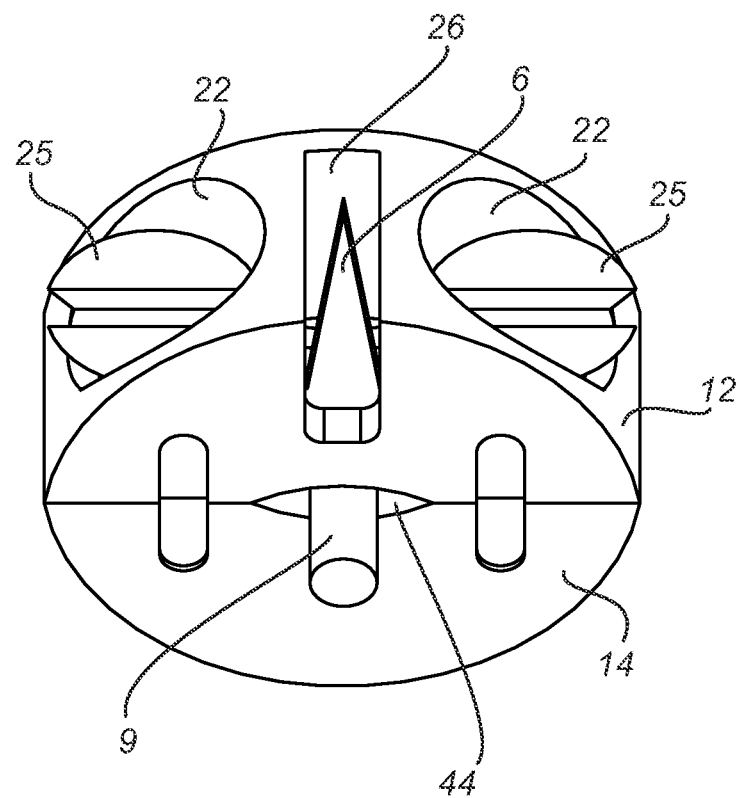
FIG. 39 is a top perspective view of the adapter assembly of FIG. 33 fitted around the pointer of FIG. 33.
Figure 40:
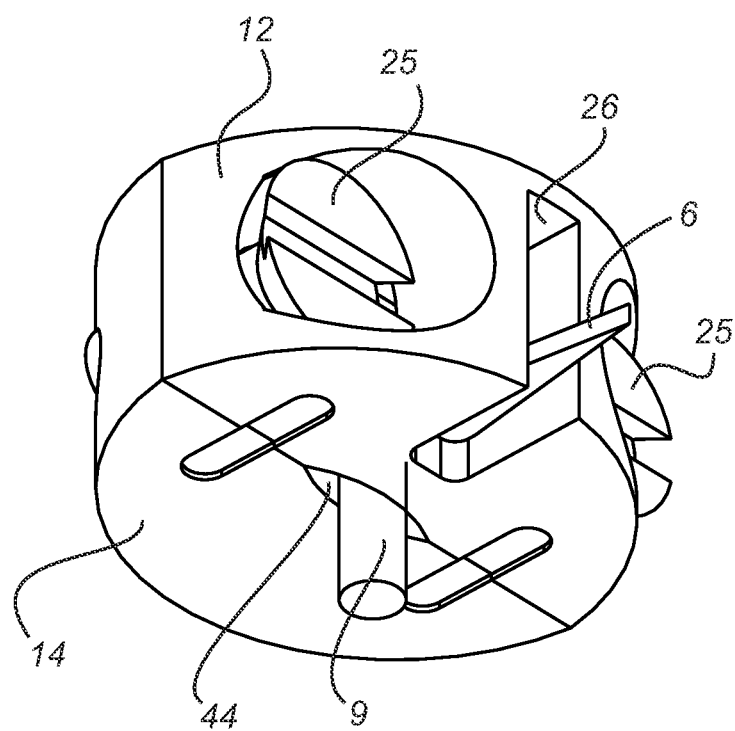
FIG. 40 is a rear perspective view of the adapter assembly of FIG. 33 fitted around the pointer of FIG. 33.
Figure 41:
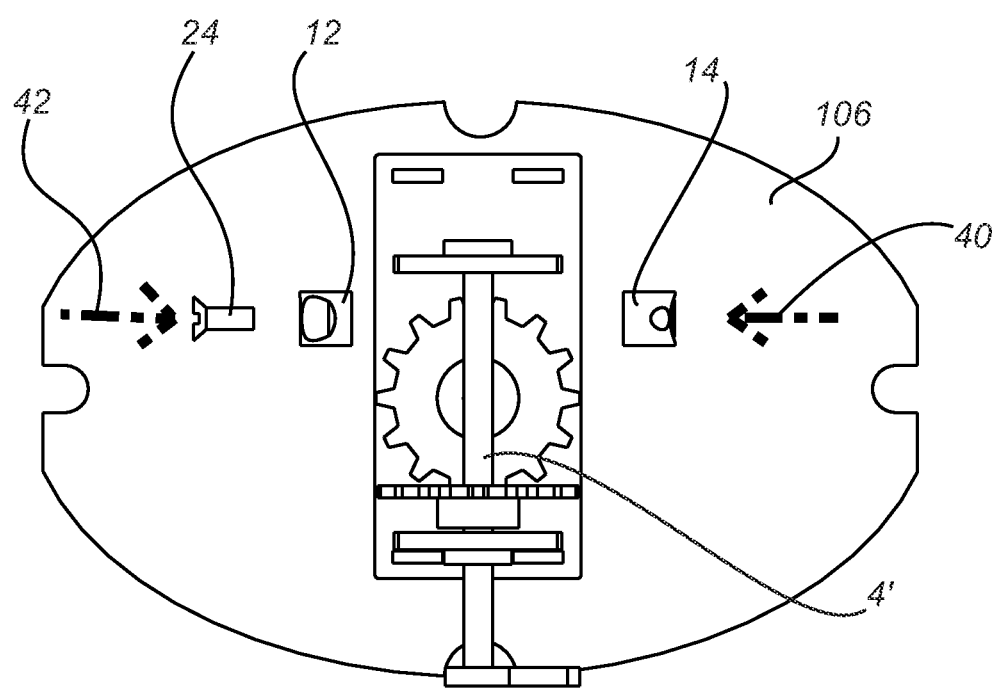
FIG. 41 is a rear perspective view of a fourth index positioned with respect to the upper portion of FIG. 5 and the lower portion of FIG. 11, according to one version.
Figure 42:
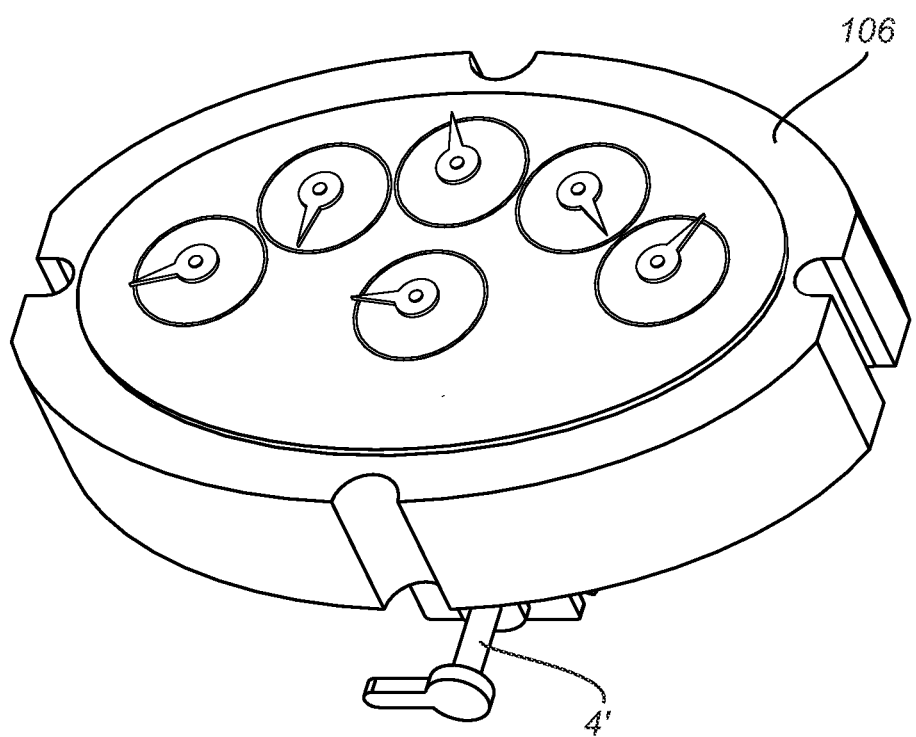
FIG. 42 is a front perspective view of the fourth index of FIG. 41 fitted with the adapter assembly of FIG. 41.
Figure 43:
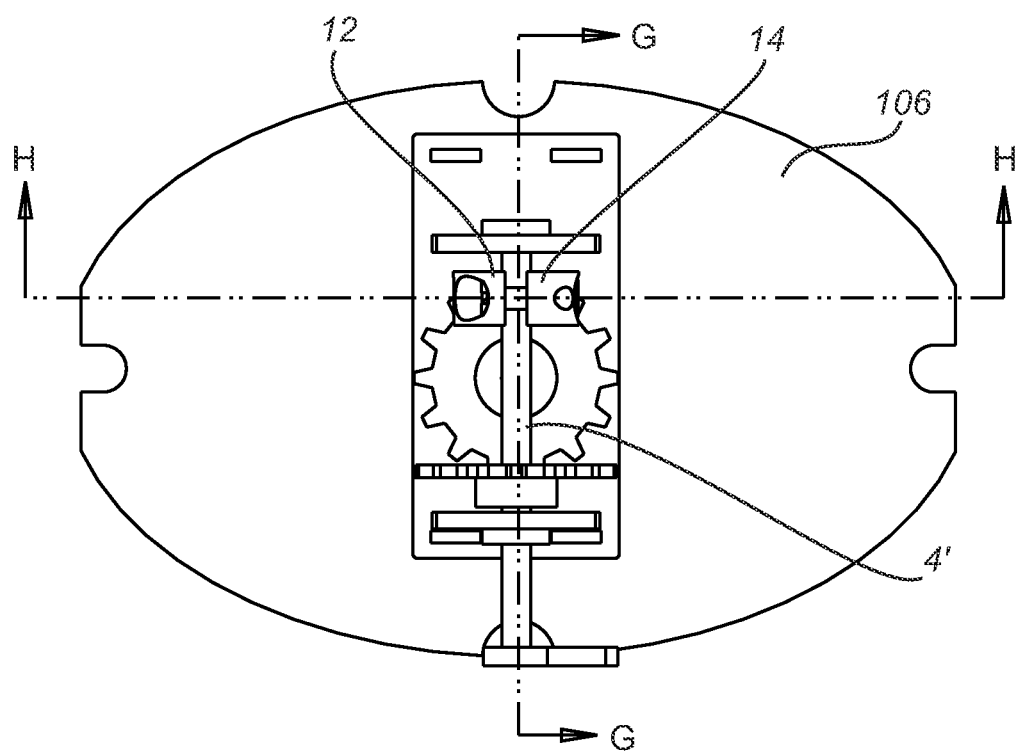
FIG. 43 is a rear plan view of the fourth index of FIG. 41 fitted with the adapter assembly of FIG. 41.
Figure 44:
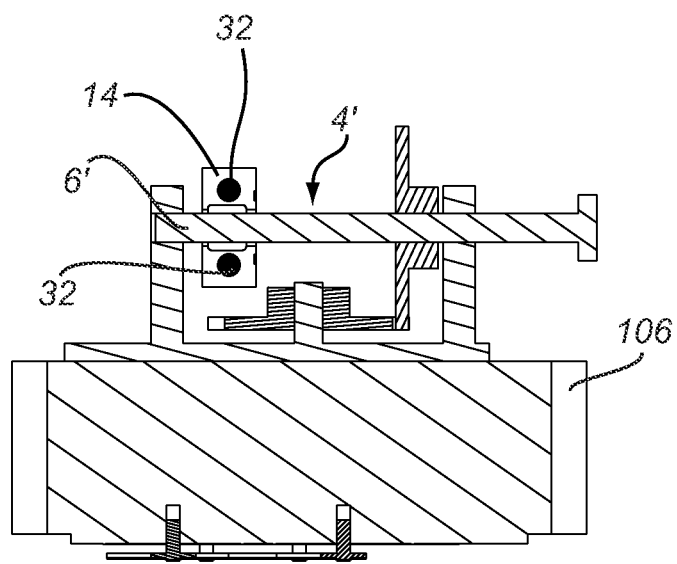
FIG. 44 is a cross-sectional view of the fourth index of FIG. 41 fitted with the adapter assembly of FIG. 41, taken along line F-F of FIG. 43.
Figure 45:
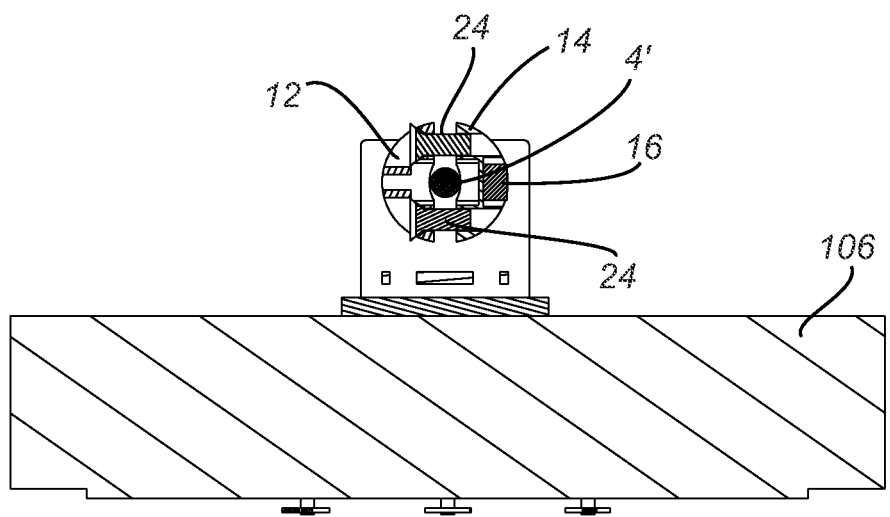
FIG. 45 is a cross-sectional view of the index of FIG. 41 fitted with the adapter assembly of FIG. 41, taken along line G-G of FIG. 43.
Figure 46:
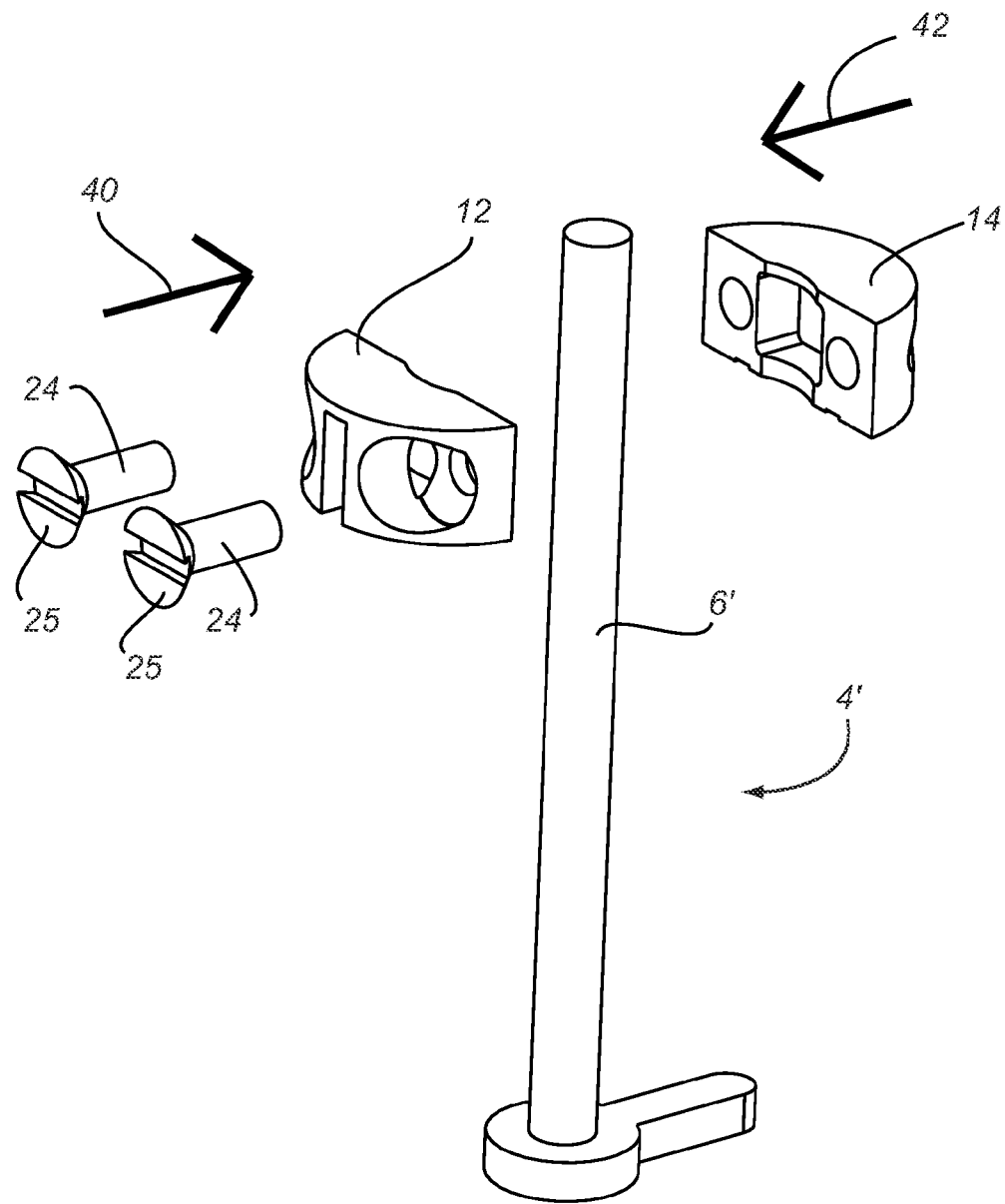
FIG. 46 is an exploded view of the upper portion of FIG. 5 and the lower portion of FIG. 11 positioned with respect to the shaft of the fourth index of FIG. 41.
Figure 47:
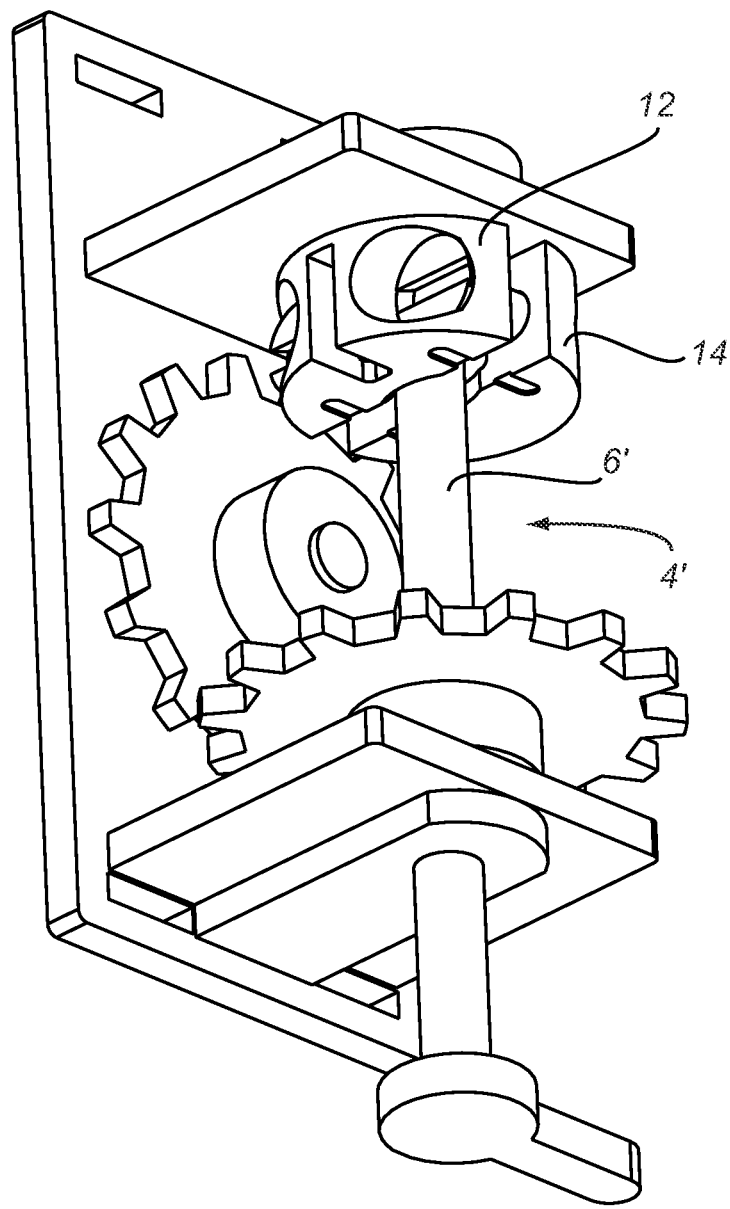
FIG. 47 is a rear perspective view of the adapter assembly of FIG. 41 fitted around the shaft of FIG. 41.

As shown in FIGS. 24-25, for example, when lower portion 14 and upper portion 12 are fitted together, a space is formed between the cutout 36 on upper portion 12 and the cutout 37 on lower portion 14 that accommodates a generally cylindrical stem 9 of a pointer 4. When adapter assembly 10 is used with indexes that have pointers of various configurations (see, for example, indexes 104 and 106 illustrated in FIGS. 31 and 46 having shafts 4'), cutouts 36, 37 accommodate the generally cylindrical tip end 6' of shaft 4'. If the index 104 (FIG. 31) is used, apertures 38 and 39 of the upper and lower portions accommodate the body 8' of shaft 4'.

Figure 1:
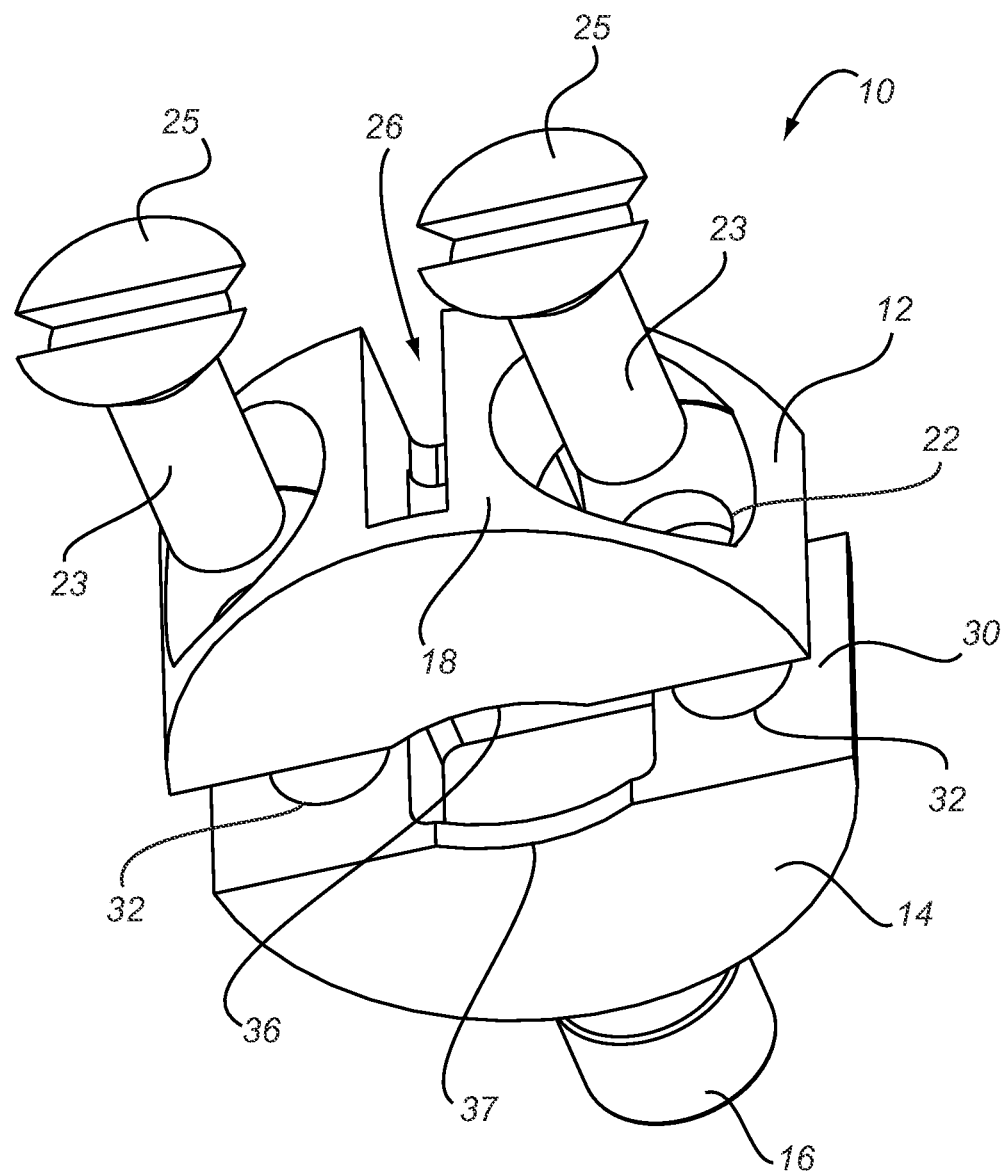
FIG. 1 is an exploded perspective view of an adapter assembly according to one version.
Figure 2:
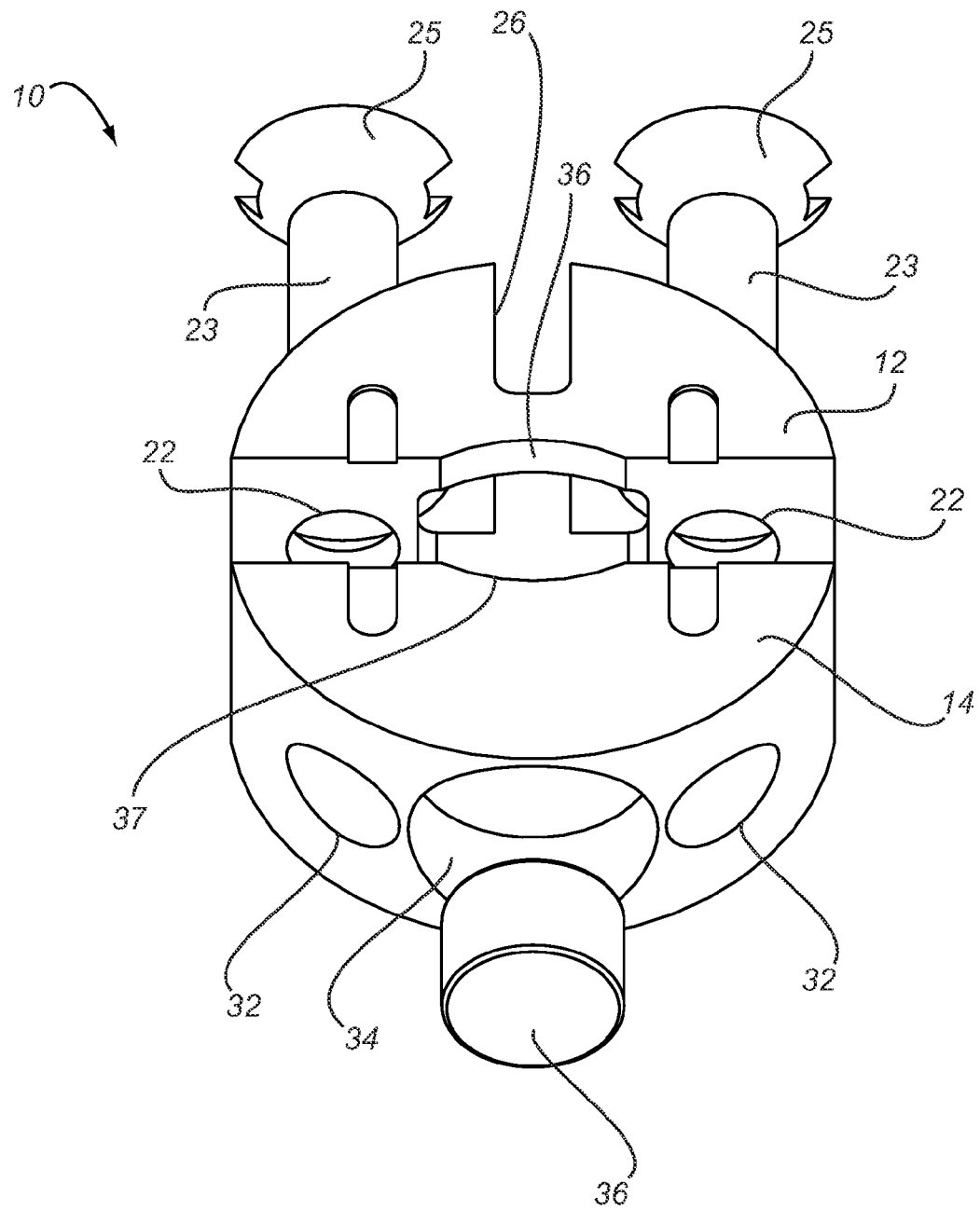
FIG. 2 is another perspective view of the adapter assembly shown in FIG. 1.
Figure 3:
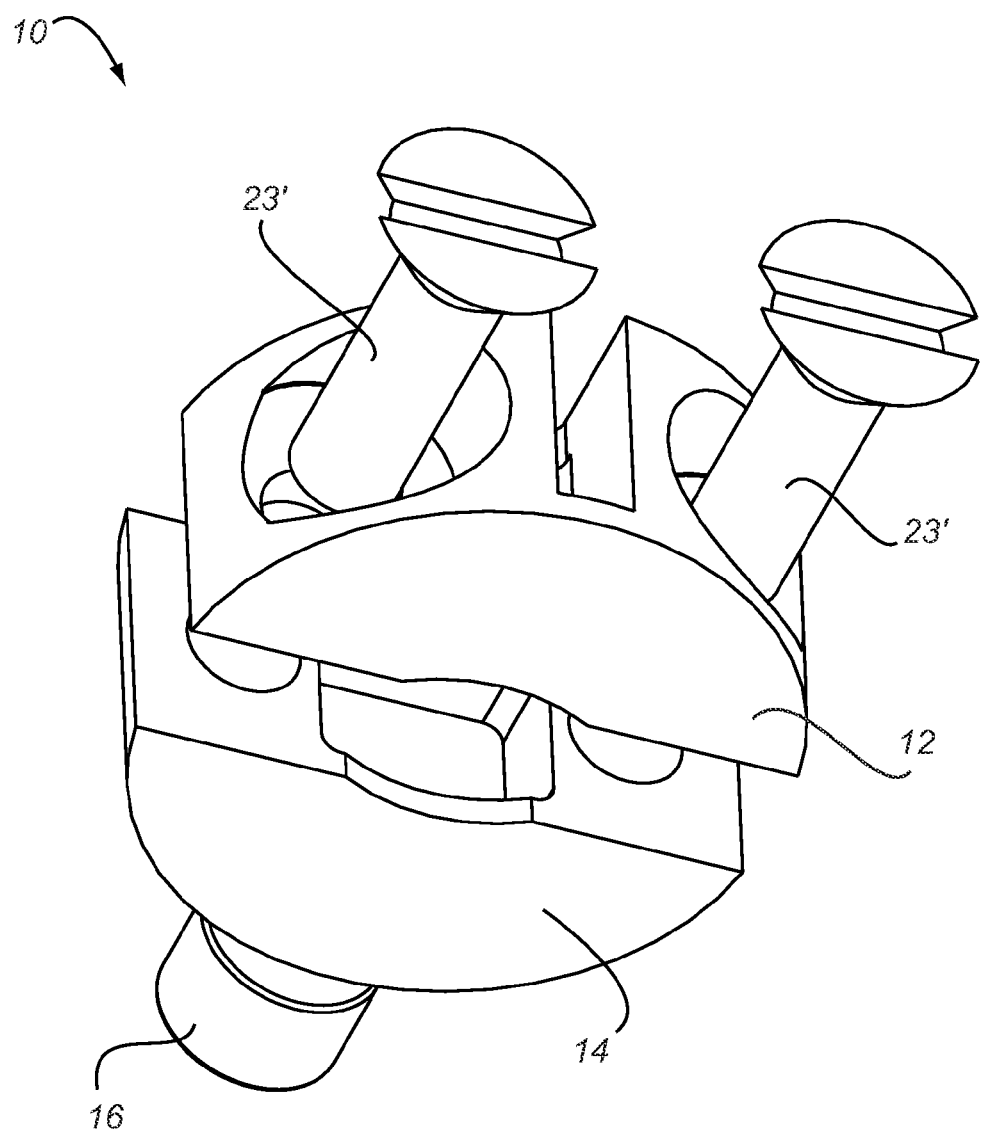
FIGS. 3-4 are exploded perspective views of the adapter assembly of FIG. 1, shown with longer fasteners.
Figure 4:
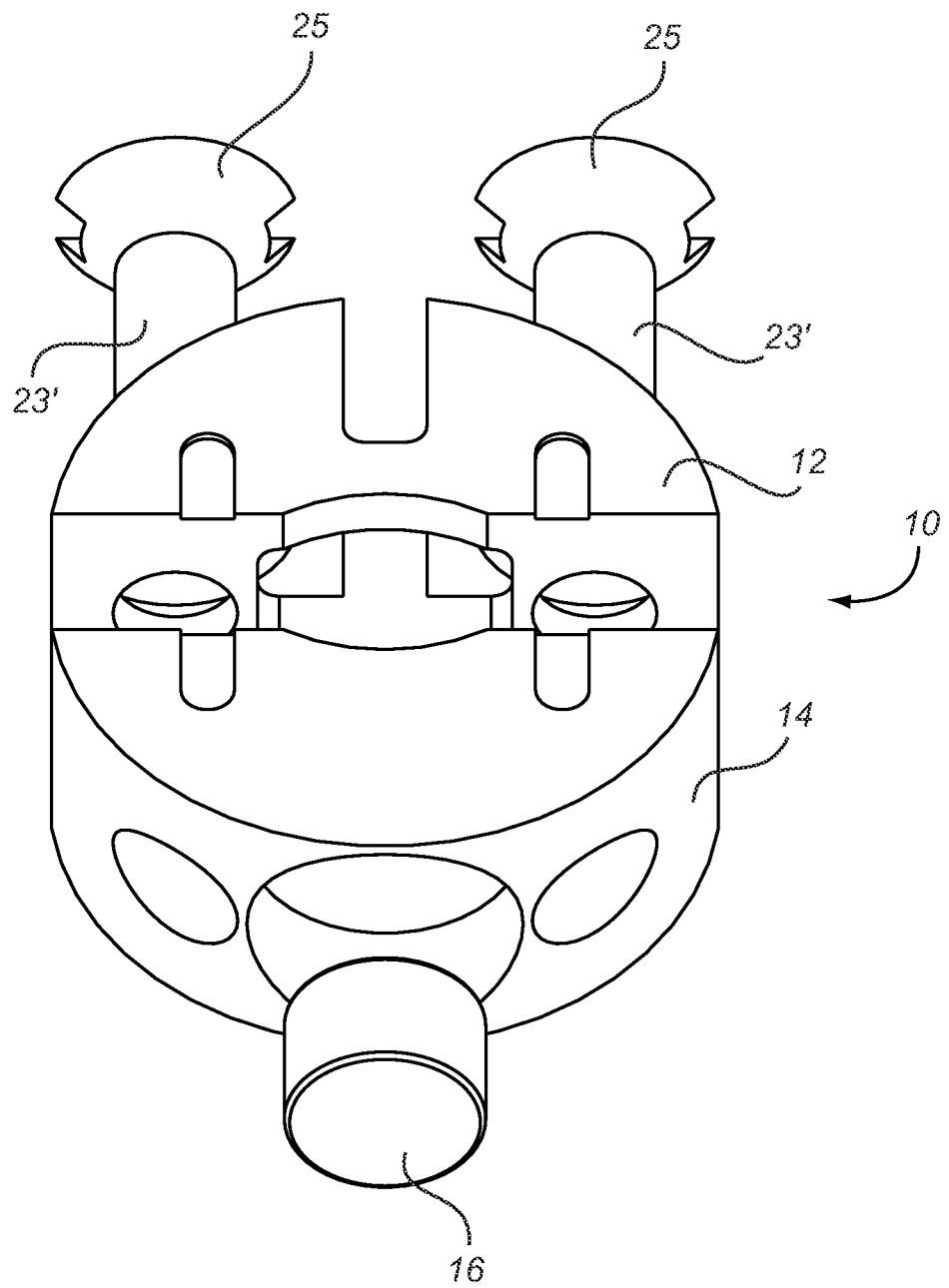
Figure 5:
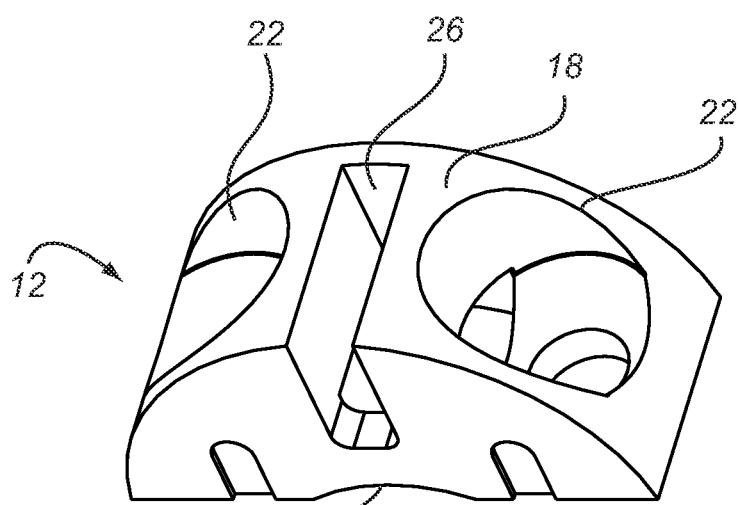
FIG. 5 is a top perspective view of the upper portion of the adapter assembly of FIG. 1.

As shown in FIGS. 11-12, one or more openings 32 are formed in lower portion 14, the one or more openings being shaped and sized to receive one or more fasteners 24. In the adapter shown, lower portion 14 includes two openings 32. Openings 32 extend from the top surface 28 through the bottom surface 30. In some adapters, openings 32 are sized and shaped to accommodate a body of a fastener, such as body 23 of fastener 24 shown in FIG. 1. When the upper portion 12 and the lower portion 14 mate together, the openings 22 of the upper portion 12 are configured to align with the openings 32 of the lower portion 14. In this way, a fastener (such as fastener 24) can be inserted through openings 22 and 32 to secure the upper portion 12 to the lower portion 14. Although fastener 24 is illustrated as a screw, any suitable fastener may be used. In adapters where the fastener is a screw, at least openings 32 may be threaded to correspond to the threads on body 23 or 23' of the fastener 24. Fasteners 24 may have any suitable configuration. For example, the body 23 of fastener 24 of FIGS. 1-2 is shorter than the body 23' of fastener 24 shown in FIGS. 3-4. The length of the body of the fastener to be used is determined by the type of index with which the adapter assembly will interface (for example, in some adapters, fasteners of a shorter length are used with face mount indexes, while fasteners of a longer length are used with back mount indexes).

A cavity 34 is formed in the top surface 28 of the lower portion 14. Cavity 34 is sized and shaped to receive a magnet, such as magnet 16 illustrated in FIGS. 1-4. Magnet 16 may be secured within cavity 34 in any suitable way including, but not limited to, by use of an adhesive or by including a plurality of ribs (not shown) that help contain magnet 16 within cavity 34 once magnet 16 is pressed into cavity 34.

As mentioned above, upper portion 12 fits together with lower portion 14 to form adapter assembly 10 for use with an index. As illustrated in FIGS. 18-47, adapter assembly 10 is configured to be used with indexes having various configurations, such as index 100 (FIGS. 18-22), index bracket 102 (FIGS. 26-30), index 104 (FIGS. 33-37), and index 106 (FIGS. 41-45). The pointers 4 of indexes 100 and 104 are similar in configuration, while the shafts 4' of index bracket 102 and index 106 differ from pointers 4. Adapter assembly 10 is configured to accommodate the various pointers/shafts of various indexes.

Figure 18:
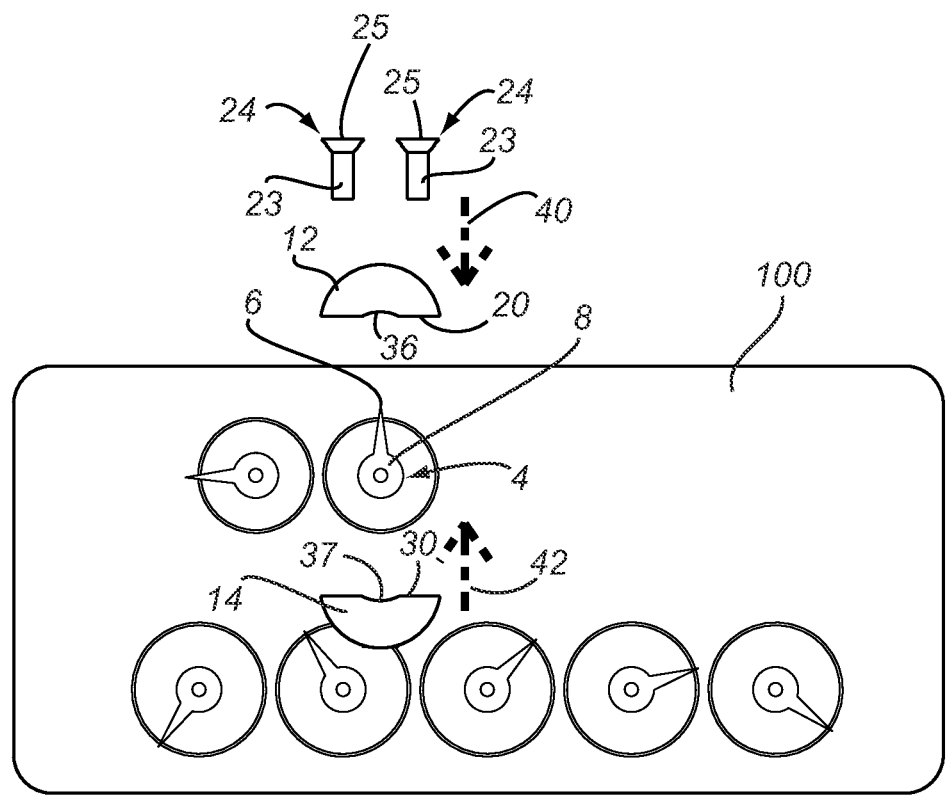
FIG. 18 is a front plan view of a first index positioned with respect to the upper portion of FIG. 5 and the lower portion of FIG. 11, according to one version.
Figure 19:
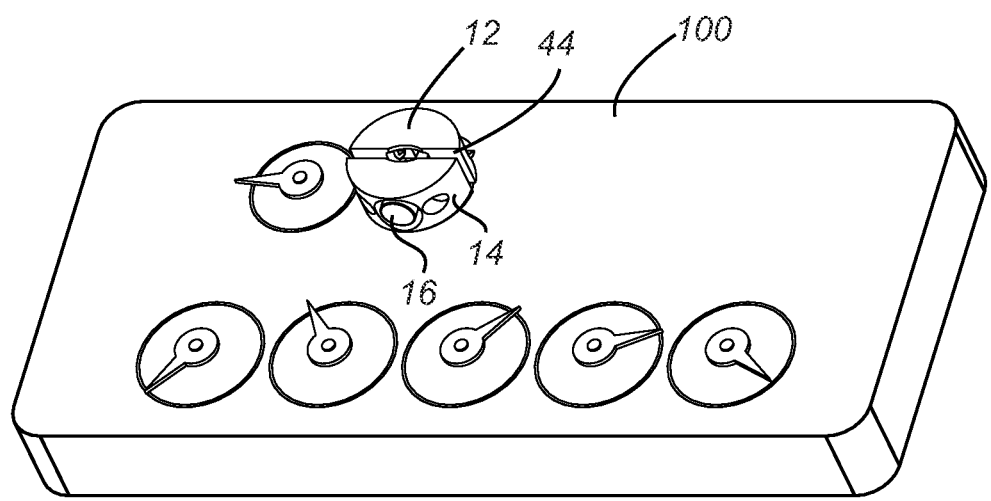
FIG. 19 is a front perspective view of the first index of FIG. 18 fitted with the adapter assembly of FIG. 18.
Figure 20:
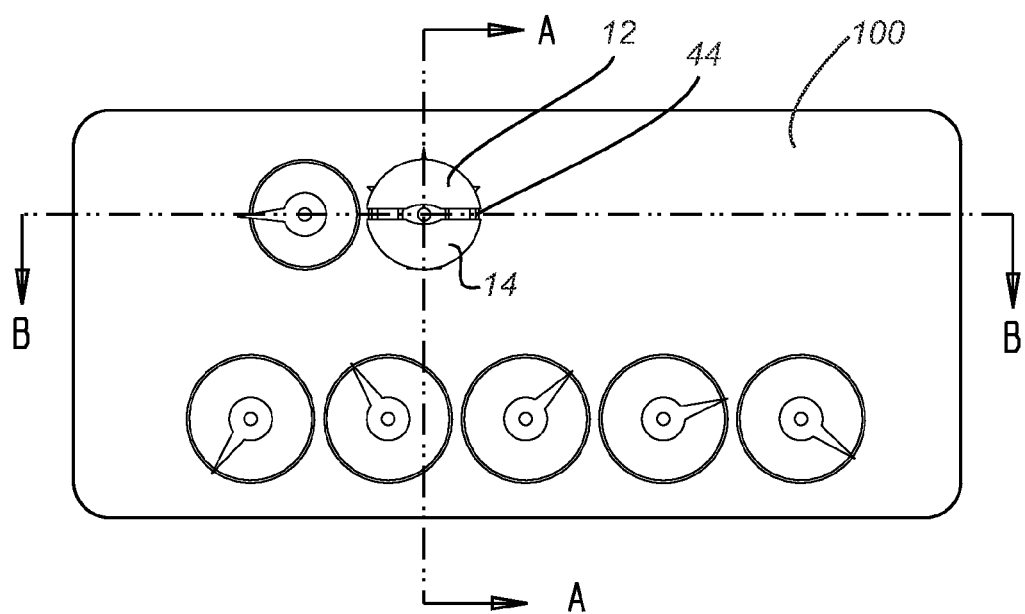
FIG. 20 is a front plan view of the first index of FIG. 18 fitted with the adapter assembly of FIG. 18.
Figure 21:
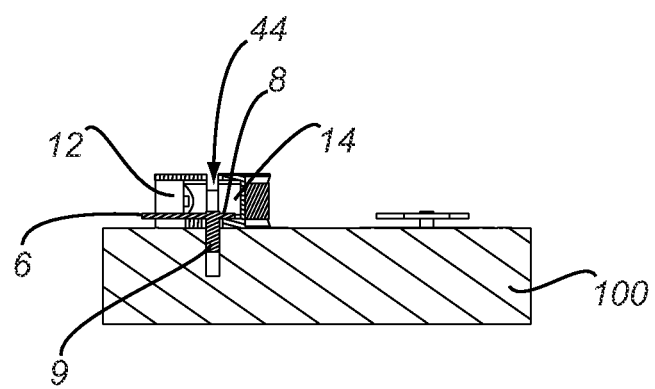
FIG. 21 is a cross-sectional view of the first index of FIG. 18 fitted with the adapter assembly of FIG. 18, taken along line A-A of FIG. 20.
Figure 22:
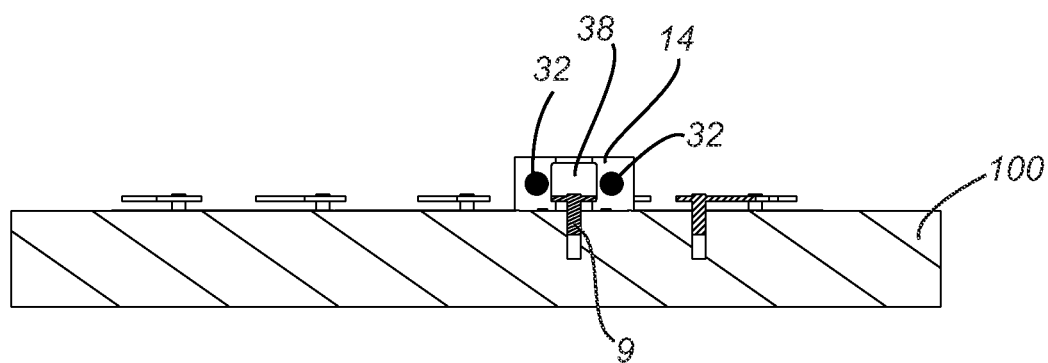
FIG. 22 is a cross-sectional view of the first index of FIG. 18 fitted with the adapter assembly of FIG. 18, taken along line B-B of FIG. 20.
Figure 23:
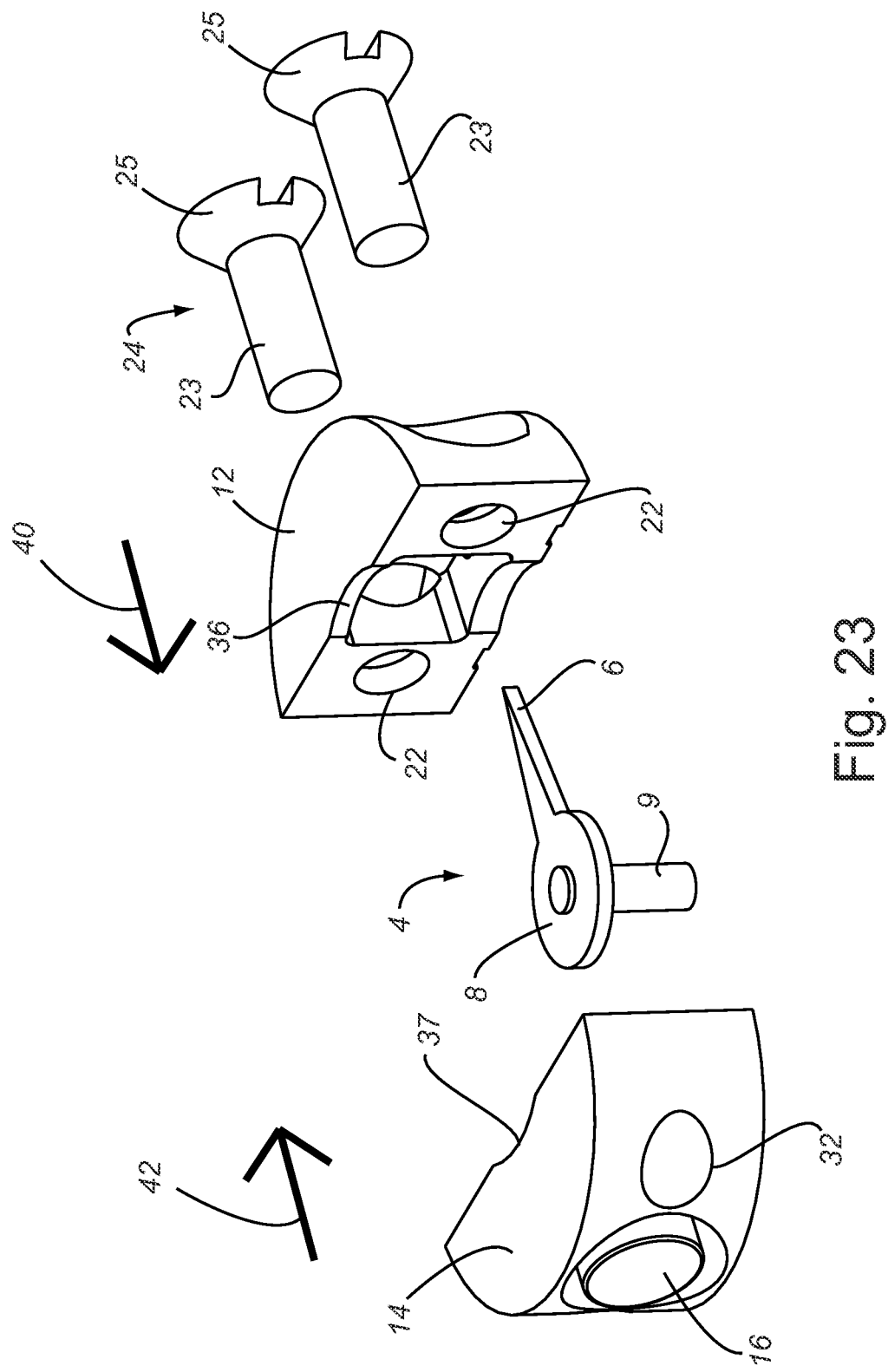
FIG. 23 is an exploded view of the upper portion of FIG. 5 and the lower portion of FIG. 11 positioned with respect to the pointer of the first index of FIG. 18.

Regardless of the index used, the bottom surface 20 of upper portion 12 is positioned with respect to the bottom surface 30 of lower portion 14 as the upper portion 12 and lower portion 14 fit together (see FIG. 18, for example).

In use, as shown in FIGS. 18-47, upper portion 12 and lower portion 14 mate together to engage a pointer 4 of an index such as index 100 (FIGS. 18-22) or index 104 (FIGS. 33-37), or shaft 4' of an index such as index bracket 102 (FIGS. 26-30) or index 106 (FIGS. 41-45). Specifically, upper portion 12 is positioned with respect to the desired index from a first direction 40. (As mentioned above, in the adapters where the upper portion and lower portion are of the same general size and shape, instead of upper portion 12, the lower portion 14 could be positioned from the first direction 40 so long as the pointer is properly accommodated.) In the adapters of FIGS. 18-22 and 33-37, the upper portion 12 is positioned so that the tip 6 of pointer 4 slides through recess 26 of upper portion 12 and so that the body 8 of pointer 4 rests within aperture 39 of upper portion 12 and aperture 38 of lower portion 14. Recess 26 is large enough to accommodate various standard tips 6 or 6' of pointers 4 or shafts 4', while apertures 38 and 39 are large enough to accommodate various standard widths of bodies 8 or 8' of pointers 4 or shafts 4'. Recess 26 and apertures 38 and 39 are sized so that both the tip 6 or 6' and the body 8 or 8' are received snuggly within recess 26 and aperture 39, respectively, to maintain the alignment of pointer 4 or shaft 4' within the adapter assembly 10 and prevent upper portion 12 and lower portion 14 from wobbling. In some adapters, the adapter assembly 10 is positioned adjacent the tip 6 or tip end 6' of the pointer 4 or shaft 4' (see FIGS. 23, 31, 38, and 46, for example).

Next, lower portion 14 is positioned with respect to an index, such as index 100, index bracket 102, index 104 or index 106 from a second direction 42, which is opposite first direction 40, so that lower portion 14 cooperates with pointer 4 or shaft 4' and is mated onto upper portion 12 (FIGS. 23, 31, 38, 46). (As mentioned above, in the adapters where the upper portion and lower portion are of the same general size and shape, instead of lower portion 14, the upper portion 12 could be positioned from the second direction 42 so long as the pointer is properly accommodated.) When adapter assembly 10 is used with index 100, index bracket 102 and index 104 (FIGS. 23, 31, 38), body 8 or 8' of pointer 4 or shaft 4' abuts the aperture 38 of lower portion 14 and the aperture 39 of upper portion 12 when the lower portion 14 is mated to the upper portion 12. As mentioned above, the presence of cutouts 36, 37 in the upper portion 12 and the lower portion 14 is such that either the tip end 6' (the configurations shown in FIGS. 31 and 46) or the tip 6 (the configurations shown in FIGS. 23 and 38) is accommodated between upper portion 12 and lower portion 14 when the two components fit together. As mentioned above, lower portion 14 can be secured with respect to upper portion 12 in any suitable manner.

The rotation of the internal gears of the gas meter cause the pointer 4 or shaft 4' to rotate, which can be used to track consumption as described above. Because the adapter assembly 10 is securely coupled to the pointer 4 or shaft 4', the rotation of the pointer 4 or shaft 4' causes the adapter assembly 10, and thus the magnet 16, to also rotate in a concentric motion. The rotation of the magnet generates magnetic pulses that can be used to determine that the adapter assembly 10 is present on the index (such as index 100, index bracket 102, index 104, or index 106) and/or can be used to track the number of rotations of the pointer of the utility meter, and thus the consumption of gas as known to those of skill in the art. The configuration of upper portion 12 and the lower portion 14 allows the two components to fit together around pointer 4 or shaft 4' in a manner that allows the adapter assembly 10 to track to the pointer 4 or shaft 4' without impacting the rotation of the pointer.

In some versions, a sensor board and radio assembly (not shown) are mounted adjacent the adapter assembly 10 and receive the pulses generated by the magnets, convert them into electronic form, and transmit them to a remote location. In some versions, the sensor board and radio assembly are positioned relative to the side of the index due to space constraints. In other versions, the sensor board and radio assembly are positioned relative to the back of the index. In these versions, the adapter assembly 10 is configured to engage the pointer 4 or shaft 4' at the back of the index (see, for example, FIGS. 42-47). The adapter assembly 10 is configured to work with all different types of indexes, including front, top, and back mounted indexes. In this way, the adapter assembly 10 is configured to be somewhat "universal," in that it can be used with indexes having various configurations and/or can be used with existing/off-the-shelf indexes. In some versions, the adapter assembly 10 is particularly well suited for use with the indexes of commercial meters. For example, adapter assembly 10 is configured to work with American brand plastic and metal dial indexes, Schlumberger brand plastic and metal indexes, Sprague brand plastic and metal indexes, and Rockwell brand plastic and metal indexes.

In some adapters, instead of being a "universal" type adapter assembly, the configuration of the adapter assembly is adjusted based on the configuration of the index with which the adapter assembly is to be used. In some adapters, the configuration of the upper portion and the lower portion (in some cases, the gap formed between the two cutouts 36, 37) is dictated by the diameter of the stem 9 (if used with pointers of indexes 100 or 104) or by the diameter of the tip 6' (if used with the pointers of index bracket 102 or index 106). In other words, the gap formed between the two cutouts 36, 37 when upper portion 12 and lower portion 14 are fitted together is large enough to accommodate any stem 9 or tip 6 or tip end 6', depending on whether pointer 4 or shaft 4' is used.

In some adapters, the adapter assembly 10 is configured so that it does not contact the index in use. This reduces stress or friction on the index, which could shorten the life span of the index, as adapter assembly 10 rotates with pointer 4 or shaft 4'. Moreover, the adapter assembly 10 is configured to allow pointer 4 or shaft 4' to rotate without obstruction.

In some adapters, upper portion 12 and/or lower portion 14 are formed of polycarbonate, which is lightweight compared to the magnet 16, which is made of neodymium and iron in some adapters. In other adapters, upper portion 12 and/or lower portion 14 are formed of aluminum or any other suitable material. The lightweight nature of the adapter assembly 10 allows it to rotate freely with the pointer 4 or shaft 4' and without exerting undue pressure on the pointer 4 or shaft 4' (and in turn on the index). In other adapters, adapter assembly 10 is made of other suitable materials. As shown in FIGS. 18-47, adapter assembly 10 is small enough that the majority of the index is still visible when adapter assembly 10 engages pointer 4 or shaft 4'.

Numerous modifications of this invention may be made in the composition, application, manufacturing process and other aspects of this invention without departing from the objectives and spirit of the description above and in the Figures.

The invention claimed is:

1. An adapter for use with a utility meter having either a pointer or a shaft rotationally coupled to an index, the adapter comprising:
   (a) a generally semi-cylindrical upper portion comprising:
      (i) a recess for receiving a tip of the pointer or shaft; and
      (ii) an aperture for receiving a body of the pointer or shaft;
      (iii) at least one opening for receiving a fastener; and
      (iv) a cutout extending from a generally flat portion of the upper portion;
   (b) a generally semi-cylindrical lower portion comprising:
      (i) at least one cavity for receiving a magnet;
      (ii) an aperture for receiving a body of the pointer or shaft;
      (iii) at least one opening for receiving the fastener; and
      (iv) a cutout extending from a generally flat portion of the upper portion.

2. The adapter of claim 1, further comprising at least one magnet that is received within the at least one cavity of the lower portion for sending magnetic pulses as the pointer or shaft rotates.

3. The adapter of claim 1, wherein the upper portion and the lower portion are substantially the same size.

4. The adapter of claim 1, wherein a space is formed between the cutout of the upper portion and the cutout of the lower portion when the two are fitted together, the space configured to receive a stem of the pointer or shaft.

5. The adapter of claim 1, wherein the at least one opening of the upper portion aligns with the at least one opening of the lower portion when the two are fitted together.

6. The adapter of claim 1, wherein one of the at least one openings comprises threads.

7. The adapter of claim 1, wherein the adapter is configured for use with utility meters of different configurations and having different pointers or shafts.

8. A method for adapting a utility meter having an index with a rotatable pointer or a rotatable shaft comprising:
   providing a generally semi-cylindrical upper portion comprising at least one opening, a recess, an aperture, and a cutout extending from a generally flat portion of the upper portion;
   providing a generally semi-cylindrical lower portion comprising at least one opening, a cavity, an aperture, and a cutout extending from a generally flat portion of the lower portion;
   aligning the upper portion with the pointer or shaft;
   positioning the pointer or shaft adjacent the cutout of the upper portion;
   aligning the lower portion with the pointer or shaft and with the upper portion so that a portion of the pointer or shaft is positioned with respect to the cutout of the lower portion; and
   inserting a fastener through the at least one opening of the upper portion and the at least one opening of the lower portion to secure the upper portion to the lower portion around the pointer or shaft.

9. The method of claim 8, further comprising inserting a magnet into the cavity of the upper portion.

10. The method of claim 8, wherein the lower portion and the upper portion are aligned with respect to the pointer or shaft so that neither contacts the index.

11. The method of claim 8, further comprising inserting a tip of the pointer into the recess of the upper portion.

12. The method of claim 8, further comprising aligning the upper portion and the lower portion with respect to the pointer or shaft so that a body of the pointer or shaft is received within the aperture of the upper portion and the aperture of the lower portion.

13. The method of claim 8, further comprising aligning the upper portion and the lower portion with respect to the pointer or shaft so that a stem of the pointer or shaft is received within a space formed between the cutout of the upper portion and the cutout of the lower portion.

14. The method of claim 8, further comprising:
   inserting a tip of the pointer into the recess of the upper portion; and
   aligning the upper portion and the lower portion with respect to the pointer or shaft so that a body of the pointer or shaft is received within the aperture of the upper portion and the aperture of the lower portion and so that a stem of the pointer or shaft is received within a space formed between the cutout of the upper portion and the cutout of the lower portion.

15. An adapter for use with a utility meter having a pointer or a shaft rotationally coupled to an index, the adapter comprising:
   a lower portion that is configured to interface with at least a portion of the pointer or shaft and that comprises at least one cavity;
   an upper portion that mates with the lower portion and that is configured to interface with at least a portion of the pointer or shaft so that the upper portion rotates when the pointer or shaft rotates;
   wherein the at least one cavity is aligned with an axis of rotation of the pointer or shaft when the upper portion interfaces with the pointer or shaft, and
   wherein the upper portion and the lower portion each comprise at least one opening for receiving a fastener, wherein the at least one opening of the upper portion aligns with the at least one opening of the lower portion when the upper portion and the lower portions are fitted together.

16. The adapter of claim 15, wherein the adapter is generally circular when the upper portion and the lower portion are fitted together.

17. The adapter of claim 15, wherein the upper portion and the lower portion each comprise a cutout extend from a bottom surface of portion, wherein the two cutouts form a space that accommodates a portion of the pointer or shaft when the upper portion and the lower portion are fitted together.

18. The adapter of claim 17, wherein the portion of the pointer or shaft that is accommodated in the space is a stem of the pointer or shaft.

19. The adapter of claim 15, wherein the upper portion further comprises a recess that receives a tip of the pointer or shaft when the upper portion and the lower portion are rotationally coupled to the index.

20. An adapter for use with a utility meter having a pointer or a shaft rotationally coupled to an index, the adapter comprising:
- a generally semi-cylindrical lower portion that is configured to interface with at least a portion of the pointer or shaft and that comprises at least one cavity;
- a generally semi-cylindrical upper portion that mates with the lower portion and that is configured to interface with at least a portion of the pointer or shaft so that the upper portion rotates when the pointer or shaft rotates;
- wherein the at least one cavity is aligned with an axis of rotation of the pointer or shaft when the upper portion interfaces with the pointer or shaft, and
- wherein the upper portion further comprises an aperture that receives a portion of a body of the pointer or shaft when the upper portion and the lower portion are rotationally coupled to the index, and wherein the lower portion further comprises an aperture that receives another portion of the body of the pointer or shaft when the upper portion and the lower portion are rotationally coupled to the index.

* * * * *